US011122490B2

(12) United States Patent
McIlroy

(10) Patent No.: US 11,122,490 B2
(45) Date of Patent: Sep. 14, 2021

(54) MESSAGE FRAME DISAMBIGUATION IN A FLOOD FILL MESH RADIO NETWORK

(71) Applicant: Guy McIlroy, Los Gatos, CA (US)

(72) Inventor: Guy McIlroy, Los Gatos, CA (US)

(*) Notice: Subject to any disclaimer, the term of this patent is extended or adjusted under 35 U.S.C. 154(b) by 26 days.

(21) Appl. No.: 16/694,248

(22) Filed: Nov. 25, 2019

(65) Prior Publication Data
US 2020/0169355 A1    May 28, 2020

Related U.S. Application Data

(60) Provisional application No. 62/772,467, filed on Nov. 28, 2018.

(51) Int. Cl.
*H04W 40/02* (2009.01)
*H04W 56/00* (2009.01)
*H04W 40/24* (2009.01)
*H04L 1/00* (2006.01)
*H04L 1/16* (2006.01)
*H04W 40/00* (2009.01)
*H04L 12/751* (2013.01)
(Continued)

(52) U.S. Cl.
CPC ......... *H04W 40/023* (2013.01); *H04L 1/0013* (2013.01); *H04L 1/1621* (2013.01); *H04L 45/02* (2013.01); *H04L 45/32* (2013.01); *H04W 4/06* (2013.01); *H04W 8/26* (2013.01); *H04W 40/005* (2013.01); *H04W 40/246* (2013.01); *H04W 52/0216* (2013.01); *H04W 56/002* (2013.01); *H04W 56/0015* (2013.01); *H04W 56/0075* (2013.01); *H04W 84/18* (2013.01)

(58) Field of Classification Search
CPC ...... H04W 40/023; H04W 84/18; H04L 45/32
See application file for complete search history.

(56) References Cited

U.S. PATENT DOCUMENTS 8,185,653 B2  5/2012  Yau et al.
2007/0104199 A1* 5/2007  Taha ................... H04L 45/16
                                              370/392
(Continued)

OTHER PUBLICATIONS

Patent Cooperation Treaty, International Search Report for PCT/US2019/063111, dated Mar. 12, 2020, pp. 1-6.
(Continued)

*Primary Examiner* — Min Jung
(74) *Attorney, Agent, or Firm* — Pillsbury Winthrop Shaw Pittman LLP

(57) ABSTRACT

Disclosed is an improved implementation of a flood fill mesh radio network that utilizes message age disambiguation to prevent unnecessary propagation of repeated messages in the network. A digital counter may be used to generate a sequence of numbers based on counter values and the counter values may be associated with each message frame that is broadcast into the mesh network. The domain of generated sequence numbers can be divided up into low and high subdomains and the maximum number of message frames broadcast by a network node in the mesh network may be constrained so that no two messages broadcast by a network node remain circulating in the network longer than that required for the digital counter to wrap back to zero. Under this paradigm the counter values associated with each message can be compared to determine the relative age of the message frames to detect repeated messages.

24 Claims, 21 Drawing Sheets

(51) Int. Cl.
  *H04L 12/721* (2013.01)
  *H04W 4/06* (2009.01)
  *H04W 8/26* (2009.01)
  *H04W 52/02* (2009.01)
  *H04W 84/18* (2009.01)

(56) References Cited

U.S. PATENT DOCUMENTS

| | | | |
|---|---|---|---|
| 2008/0165761 A1 | 7/2008 | Goppner et al. | |
| 2010/0172275 A1 | 7/2010 | Wu et al. | |
| 2010/0220658 A1* | 9/2010 | Taha | H04L 47/10 370/328 |
| 2011/0026500 A1* | 2/2011 | Shaffer | H04W 40/246 370/338 |
| 2013/0138792 A1 | 5/2013 | Preden et al. | |
| 2016/0073343 A1* | 3/2016 | Szewczyk | H04L 12/1863 370/311 |
| 2017/0156102 A1 | 6/2017 | Singh et al. | |
| 2017/0181053 A1 | 6/2017 | Aoun et al. | |
| 2017/0325127 A1* | 11/2017 | Raghu | H04B 7/15 |
| 2018/0092041 A1 | 3/2018 | Choi | |
| 2018/0199297 A1 | 7/2018 | Chen et al. | |
| 2020/0145906 A1 | 5/2020 | Crouthamel et al. | |

OTHER PUBLICATIONS

Banaei-Kashani et al., Brief Announcement: Efficient Flooding in Power-Law Networks, 2003, downloaded from https://infolab.usc.edu/DocsDemos/BanaeiPODC2003.pdf, p. 1.

Makino, A Flooding Method for Exchanging Routing Information in Power-Law Networks, Advanced Network Architecture Research Group, Oct. 5, 2005, Osaka University, Japan, pp. 1-3.

United States Patent and Trademark Office, Notice of Allowance issued in U.S. Appl. No. 16/694,146, dated May 3, 2021.

United States Patent and Trademark Office, Notice of Allowance issued in U.S. Appl. No. 16/694,137, dated Mar. 30, 2021.

Banaei-Kashani et al., "Criticality-based Analysis and Design of Unstructured Peer-to-Peer Networks as Complex Systems", Third International Workshop on Global and Peer-to-Peer Computing (GP2PC), 2003, pp. 1-6.

* cited by examiner

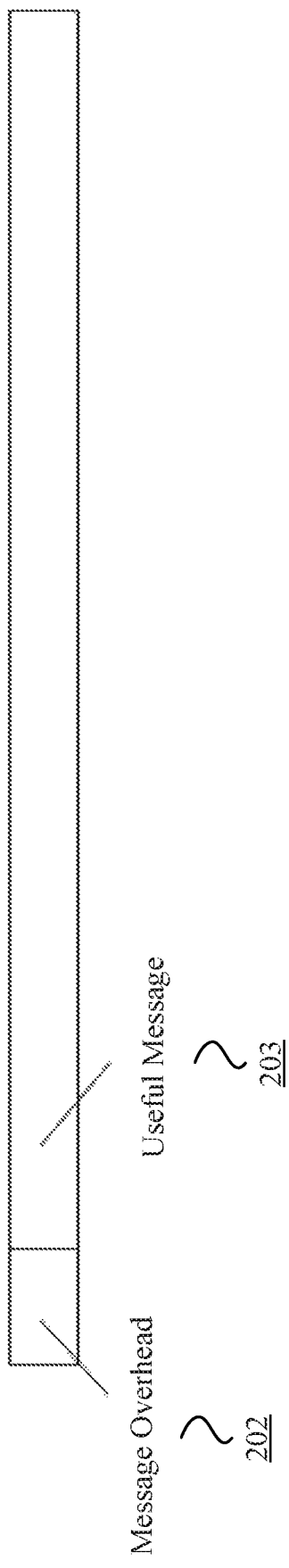

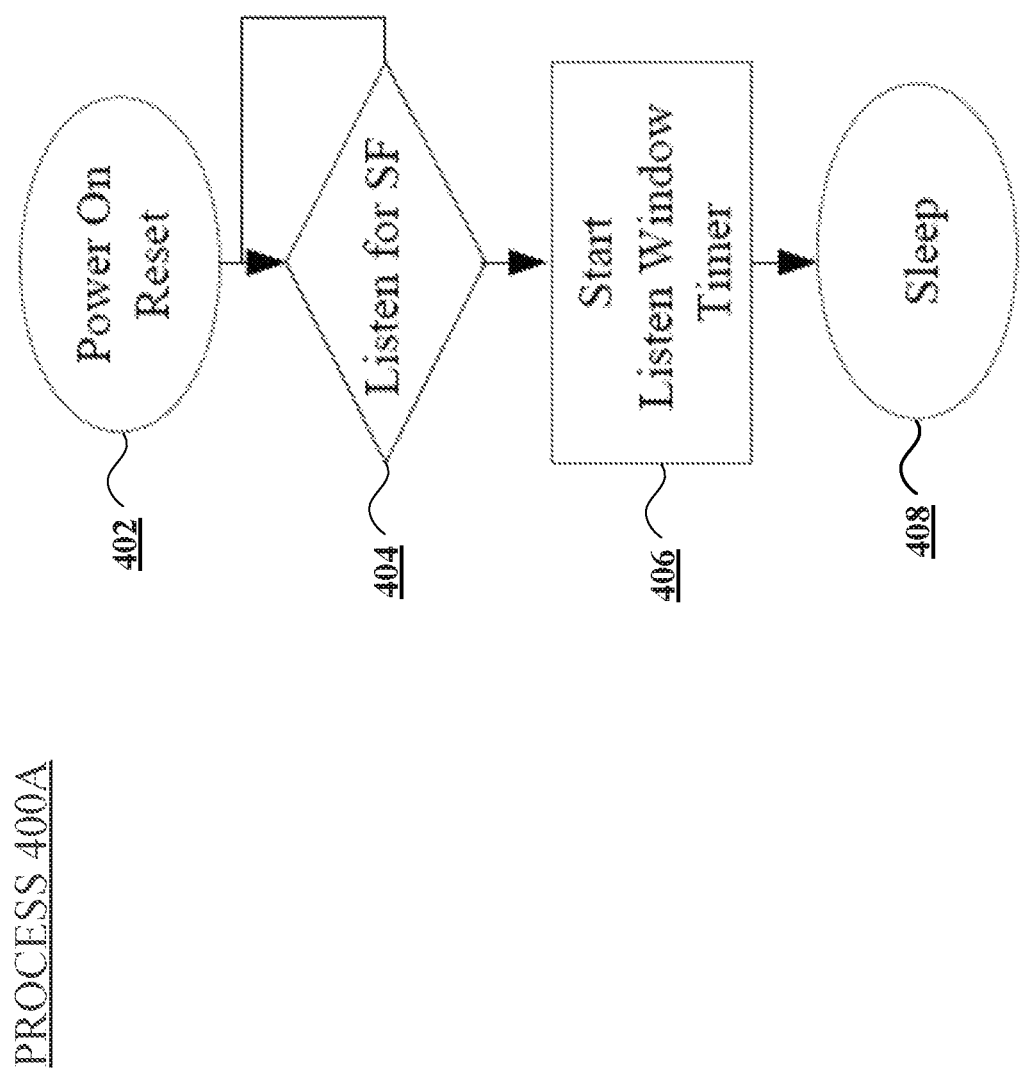

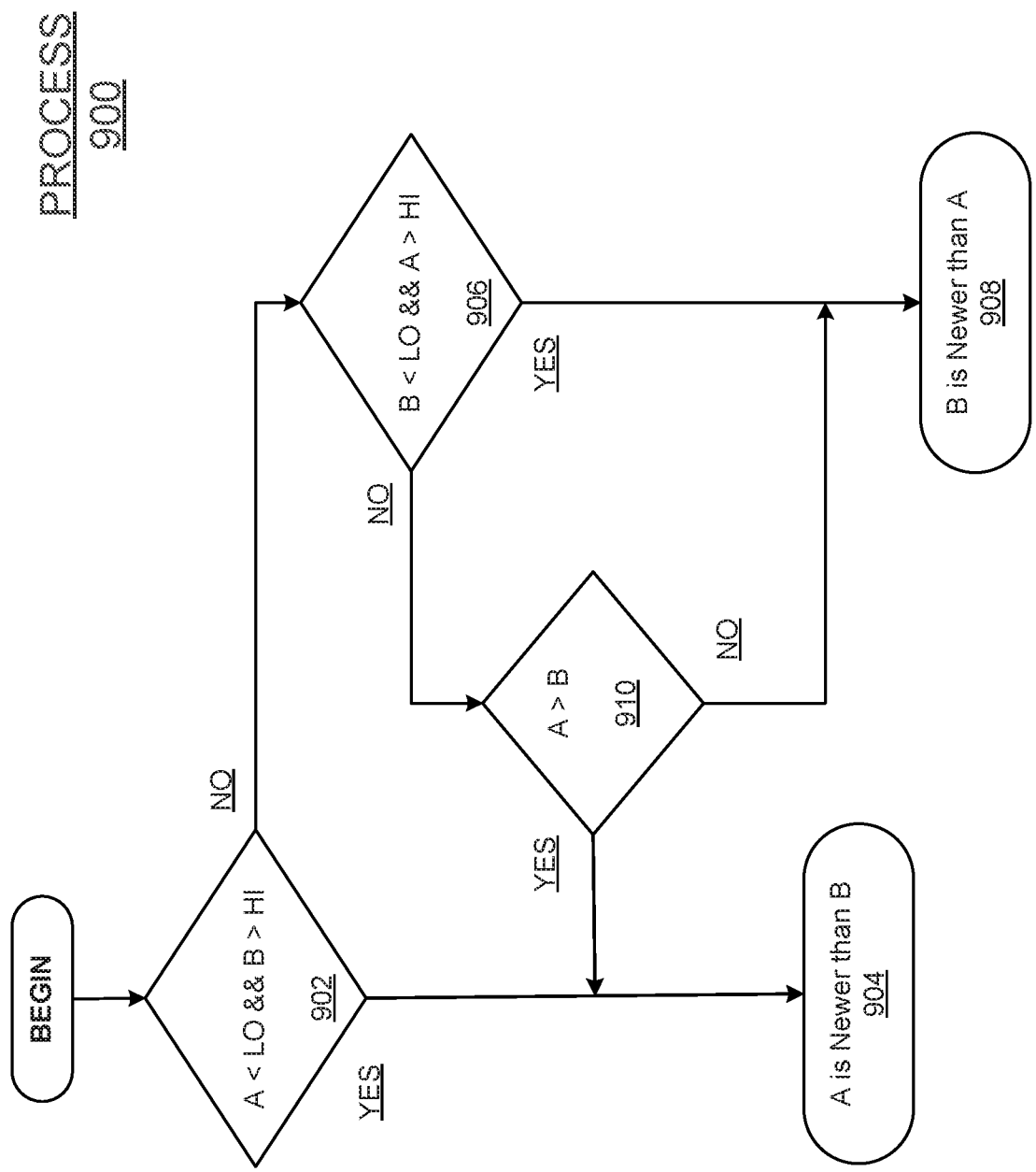

MESSAGE FRAME DISAMBIGUATION IN A FLOOD FILL MESH RADIO NETWORK

RELATED PATENT APPLICATIONS

This application is based on and claims the benefit of priority from U.S. Provisional Patent Application No. 62/772,467, filed on Nov. 28, 2018, the contents of which are hereby incorporated by reference in its entirety.

TECHNICAL FIELD

This disclosure relates generally to wireless networks, and more particularly to systems and methods using a digital counter for distinguishing among broadcast messages in mesh network.

BACKGROUND

Communications networks generally involve a configuration of network nodes (e.g., network servers, database servers, etc.) and connected channels that communicate with one another and that relay network messages from a source network node to a destination network node through their respective channels over the network. Network nodes are generally capable of creating, encapsulating and broadcasting messages from one network node to the next. Given an intended destination node, communications networks may be configured to determine (i) what pathway of nodes the network message should be relayed through to ensure arrival at the destination (ii) how quickly the network message will arrive (iii) how to know when the network message has arrived (iv) how much it costs to send the network message (in terms of time and network resources as well as financial resources) and (v) how does sending the message impact the resources of neighboring nodes that will relay the message to the destination. In general, there is a trade-off between how adaptable a communication network is and how much that adaptability costs in terms of network throughput, power, and resources.

One category of communications networks includes deterministic networks. Deterministic networks are also called linear networks. Deterministic (linear) networks include addressing schemes to ensure messages reach their intended destination and routing protocols that attempt to ensure messages take the "least cost" route from the source node to the destination node. The term "least cost" can refer to a vector comprising any number of scalar quantities such as monetary cost, power cost, memory cost, time to destination cost, etc., or combinations thereof. Typically, costs can be broken down into costs of communication channels, network node resources, power required to service network nodes and transmission channels, and time required to transmit and deliver the network messages.

But deterministic networks have a number of drawbacks. First, deterministic routing protocols inhibit the ability of nodes in a network to behave dynamically in their physical relationship with one another. There are 'adaptable' network routing protocols for deterministic networks, but those protocols take time to realize that they need to adapt, as well as additional time to reconfigure themselves for the change in network topology. This may work well where routes are relatively static (e.g., when a node goes down, another one takes over), but they are known to perform poorly in a dynamic network where the nodes are physically moving in relation to one another all the time. Such a network may include networks comprising small, low-cost and low-power mobile radio devices. When network nodes consist of mobile radios, reconfiguration of a deterministic network consumes time and power to limited useful effect and only to the extent that the device battery can sustain a charge. In a dynamic scenario, the network nodes could spend all their time reconfiguring routes and never sending any useful messages.

In addition, the resources required for maintaining routes in deterministic networks are relatively high. This is generally not a problem for static devices embedded in a network where the cost of the resources and power can scale with the volume of messages to be routed. But for a small, battery-operated device, its resources and power consumed by its resources can carry a much higher relative cost premium. Also, many networks are configured such that each communication channel is one-to-one. This means that one node talks to only one other node in the network at a given instant. Further, even if the network nodes have multiple channels, they are still communicating separately with each adjacent node on each channel which requires multiple transmissions of any given message, one transmit per channel, per node, and in many cases with significant attendant protocol overheads.

Another category of networks includes mesh networks. Mesh networks generally do not inhibit or limit dynamic reshaping of a network's topology. Here, a mesh network is defined as a network of nodes that communicate with correspondent network nodes using only broadcast network messages without using an addressing scheme or routing protocols. As used in this disclosure "correspondent network node(s)" or "correspondent(s)" refers to a group of network nodes that are in direct communication with each other; that is, they are each in range of each other's broadcasts (also referred to as "neighbor(s)" or "adjacent" network nodes). Each of the network nodes may use mobile radios to communicate with its adjacent network nodes. The mobile radios may function as repeaters in the network without requiring manual configuration. As used herein a "broadcast" network message refers to a single network message that is simultaneously communicated to the multiple network nodes on a network. When network messages are broadcast from any given node, the messages can be received by each of its neighbor nodes, and each neighbor can be configured to rebroadcast each network message to its neighbors, and so on, until the network messages are propagated throughout the mesh network. Each network node includes a receiver and a transmitter, and each has the ability to go to sleep when not in use, thus producing energy savings.

The specific category of the mesh networks described above is a "flood fill" mesh network. Flood fill mesh networks also do not use predetermined routes. Flood fill mesh networks are characterized in that any given network node only knows information about, and communicates with, adjacent network nodes on the network. In one embodiment, the term "adjacent" network node means any network node within direct range of any given network node's radio. Network nodes in a flood fill mesh network only know information about their adjacent neighbor nodes and requires no other memory, network tracking, or routing tables. To create such a network, each network node may be in range of at least one other network node and regularly broadcasts to at least one other node on the network. Further, in flood fill mesh networks, each node does not know (or care) if any given network node is a destination node for a particular network message or if it is a node along one of the pathways to the destination node. In a flood fill mesh network, node names and addresses are not required, and if used, are not required to be unique. In addition, radio transmissions from network nodes are broadcast transmissions to any and all neighbors simultaneously which avoids redundant message transmissions to each individual neighbor.

One advantage of flood-fill mesh networks is that they work well with mobile networks because flood fill networks are transparent to changes in the physical locations of the network nodes at any and all times. If the flood filling operations are performed adequately, then whichever network node a particular message was destined for will eventually receive it. Thus, building routing tables for each change is redundant.

However, flood fill mesh networks also have a number of drawbacks including (i) message path duplication—all messages traverse all paths to ensure the intended recipient is found, resulting in bandwidth overloading (ii) message replication—each node rebroadcasts each message, which without mitigation can lead to an exponential message replication and network overload (e.g., nodes receiving messages they already sent out) and (iii) resource overloading—each message travels to each node on the network which can lead to network message density saturating the nodes. And while flood fill mesh networks do not require use of node addresses, each network node still needs to know when a message arrives that was destined for it.

Bluetooth Low Energy Mesh ("BLE Mesh") is a contemporary example of a flood fill mesh network. In order to mitigate some of these drawbacks, BLE Mesh networks use various techniques, including (i) restricting the size of each mesh frame (e.g., to 8 bytes) to avoid resource overloading (ii) defining globally unique node addresses for source/destination node pairing in the network and (iii) using a long integer message identifier (e.g., 32-bit serial number) that can be used to identify each unique message received to prevent message replication. The network messages are stored in a message cache wherein the long integer message identifiers (a.k.a. serial numbers) can be compared against those of newly received network messages to identify any messages that have already been received previously.

The long integer message identifiers can be combined with a separate message "time to live" ("TTL") value to help manage message longevity and the message cache size. BLE Mesh networks are configured to use the combined TTL value with the long serial number to uniquely identify messages in the network. Network messages can be configured to be deleted when the TTL count expires. The TTL value basically indicates that a message can only travel so many hops across the nodes in the network. By analyzing the serial number of each received message, a node in a BLE Mesh network can determine it has already received a particular message and can thereafter decide to drop the message.

The downside to BLE Mesh networks is that they require a rather large table (or other data structure) of serial numbers to be maintained at each network node which can lead to local resource issues. In addition, BLE Mesh networks have very low mesh bandwidth and overall throughput, and correspondingly high resource costs—e.g., they incur significant memory and power requirements in dealing with protocol overheads.

SUMMARY

Disclosed is an improved implementation of a flood fill mesh radio network that utilizes message age disambiguation to prevent unnecessary propagation of repeated messages in the network. A digital counter may be used to generate a sequence of numbers based on counter values and the counter values may be associated with each message frame that is broadcast into the mesh network. The domain of generated sequence numbers can be divided up into low and high subdomains and the maximum number of message frames broadcast by a network node in the mesh network may be constrained so that no two messages broadcast by a network node remain circulating in the network longer than that required for the digital counter to wrap back to zero. Under this paradigm the counter values associated with each message can be compared to determine the relative age of the message frames to detect and/or discard repeated messages.

BRIEF DESCRIPTION OF THE DRAWINGS

The above aspects and other features of the innovative techniques described in this disclosure will become apparent to those skilled in the art upon review of the following description in conjunction with the accompanying figures, wherein:

FIG. 2A depicts an example embodiment of a message format for a mesh network in accordance with the techniques described in this disclosure.

FIGS. 4A-4B depict flow charts of an example embodiment of a process for synchronizing network nodes in a mesh network in accordance with the techniques described in this disclosure.

FIG. 9C depicts an example embodiment of a process for disambiguating message frames received at a network node in a network based on message age in accordance with the teachings of this disclosure.

DETAILED DESCRIPTION OF EMBODIMENTS

Throughout this description numerous details are set forth in order to provide a thorough understanding of the various embodiments described in this disclosure which are provided as illustrative examples so as to enable those of ordinary skill in the art to practice such embodiments. It will be apparent to those skilled in the art, however, that the techniques described in this disclosure may be practiced without some of these specific details, or in other instances, well-known structures and devices may be shown in block diagram form to avoid obscuring the principles and features of the techniques described in this disclosure. The drawings and examples provided are not intended to limit the scope to any single embodiment, as other embodiments are possible. In addition, where certain elements or features may be partially or fully implemented using known components, in certain instances only those portions of such known components that are necessary for an understanding of the embodiments are described, and detailed descriptions of other portions omitted so as not to obscure the description of the salient aspects and features of the novel techniques disclosed herein. Moreover, the applicant does not intend for any term or phrase in the specification or claims to be ascribed any uncommon or special meaning unless expressly set forth in this disclosure.

A Mesh Radio Network Implementation

The techniques described in this disclosure pertain to systems and methods for implementing an improved flood fill mesh network that utilizes low power and does not require any network addressing or routing protocol for network message delivery. In one embodiment of the mesh protocol all communications among network nodes are message broadcasts. In at least certain embodiments, network messages are only communicated to a network node's correspondents via broadcast network frames. In such embodiments, the network nodes are configured to only broadcast, listen or sleep—there is no notion of one network node individually communicating with one other node. Network messages propagate throughout the wireless network based on each correspondent node in turn rebroadcasting its received messages to its correspondent nodes.

Coordinated synchronization across network nodes can be achieved by each network node broadcasting synchronization frames to its correspondent nodes within a synchronization window time period, and thereafter adjusting its own start time for the next synchronization period to converge synchronization of the network nodes communicating on the wireless network. A guard band may also be utilized to account for any clock drift and signal path delays between any two communicating network nodes.

Figure 1A:
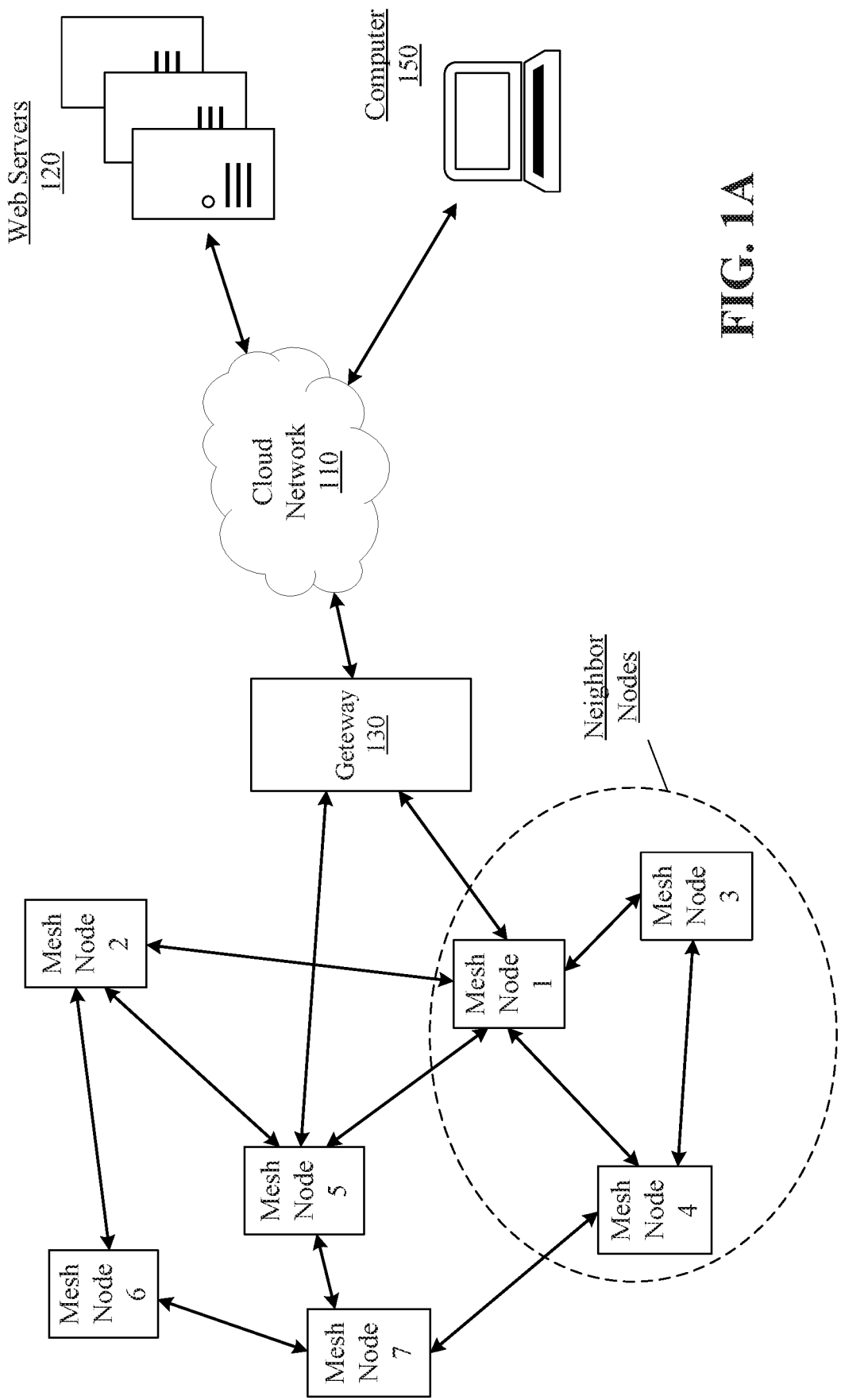
FIG. 1A depicts an overview block diagram of exemplary aspects of a wireless mesh network upon which the embodiments described in this disclosure may be implemented.

FIG. 1A depicts an overview block diagram of exemplary aspects of a wireless mesh network upon which the embodiments described in this disclosure may be implemented. In this configuration network communications can be passed between the web servers 120 and computer 150 and the various network mesh nodes 1 to 7 via a network gateway 130. Web servers 120 and computer 150 may communicate with and access data from any of the mesh nodes 1 to 7 via one or more wired or wireless cloud networks 110. Web servers 120 may include cloud-based web services such as Amazon Web Services (AWS) or Microsoft Azure. Each mesh node 1 to 7 communicates with its neighbors on the wireless mesh network. As shown, mesh node 3 in the diagram is in communication only with mesh node 1 and mesh node 4 that are node 3's neighbor nodes on the mesh network.

The network can be adapted for coordinated synchronization across network nodes. In aspects, this can be accomplished by each network node broadcasting synchronization frames to its neighbors listening on the network, and thereafter adjusting its own start time for the next synchronization period ("synchronization window") to account for any clock drift between itself and any adjacent broadcasting network nodes. Synchronization frames can be used to synchronize network nodes during the synchronization window, to indicate current mesh parameters and node state, to indicate the adjacent neighbors, and also to show network message frame receipts for network messages received. In one aspect the timing of the next synchronization window can be determined based on the receipt time of the synchronization frames received from the node's neighbors.

In order to avoid network message broadcast collisions on the network, the network message frame delivery methodology may be based on statistical probability mapped across the network with little or no network-wide node tracking or routing tables needed for message delivery. Broadcast collisions can be avoided based on configuring each network node to broadcast its synchronization frames at different times within the synchronization windows and to broadcast network messages at different times such that the probability of any two network nodes broadcasting a message frame/synchronization frame at the same moment within the same time window is substantially unlikely to occur. In a preferred embodiment, the synchronization and message frames may be broadcast at times selected randomly within the synchronization window. In a preferred embodiment, each node configures the timing of its own broadcasts, entirely independently of any other node or other influence, and prior to each synchronization window.

Further, the embodiments described in this disclosure are configured to reduce the resources and power required by conventional flood fill mesh networks (e.g., BLE Mesh). Network nodes can be configured to consume less power while maintaining synchronization with other network nodes. Each network node includes its own internal clock and may be configured to reduce power consumption by going into a sleep state for a certain percentage of time (e.g., 95% of the cycle time), and then waking up periodically to synchronize with other nodes on the network. In one embodiment the improved flood fill mesh radio network may be used in conjunction with sensor networks or various Internet of Things ("IoT") applications.

Figure 1B:
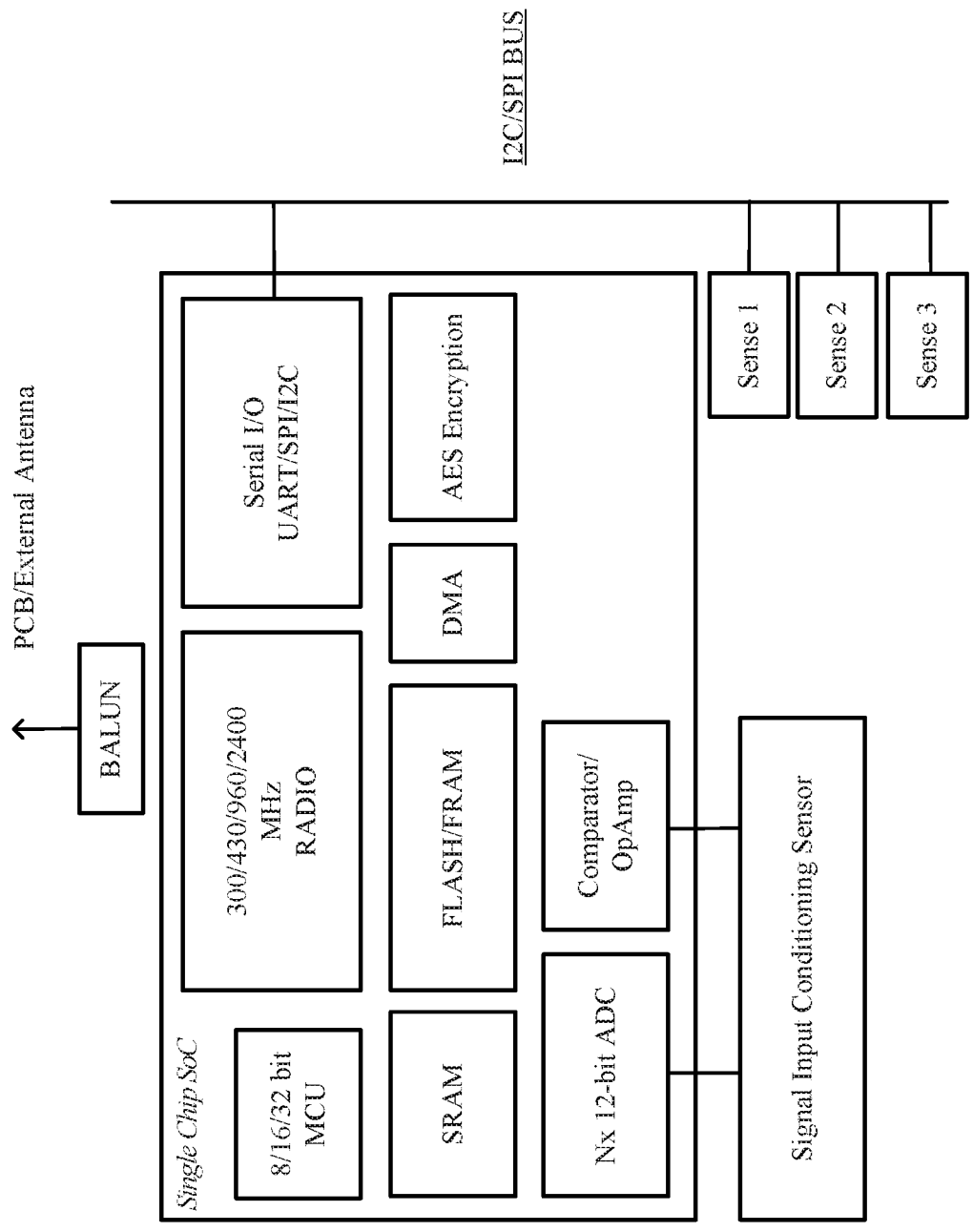
FIG. 1B depicts an example overview block diagram of a typical node radio system upon which the embodiments described in this disclosure may be implemented.

FIG. 1B depicts an example overview block diagram of a typical node radio system 140 upon which the embodiments described in this disclosure may be implemented. Notwithstanding, embodiments of the present disclosure may be practiced using various computer systems including handheld devices, microprocessor systems, programmable electronics, laptops, tablets and the like. The embodiments can also be practiced in distributed computing environments where tasks are performed by remote processing devices that are linked through one or more wire-based or wireless networks. A hardware and/or software module may be implemented mechanically, electronically, or any suitable combination thereof. Computer hardware may include dedicated circuitry or logic that is permanently configured to perform certain operations. For example, a hardware module may be a special-purpose processor, such as a Field Programmable Gate Array ("FPGA") or an Application Specific Integrated Circuit ("ASIC"), Programmable Logic Device ("PLD"), etc. Computer hardware module may also include programmable logic or circuitry that is temporarily configured by software to perform operations. For example, computer hardware may include software executed by a general-purpose processor or other programmable processor. Once configured by such software, hardware modules may become specific machines (or specific components of a machine) tailored to perform one or more configured functions.

It will be appreciated by persons of skill in the art that the decision to implement a hardware module mechanically in dedicated and permanently configured circuitry or in temporarily configured circuitry (e.g., configured by software) may be driven by cost and time considerations. Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain of the operations described in this disclosure. Similarly, the functions described in this disclosure may be at least partially processor implemented, with a particular processor or processors being an example of computer hardware. For example, at least some of the operations described herein may be performed by one or more processors or processor-implemented hardware modules. Moreover, the one or more processors may also operate to support performance of the relevant operations in a cloud computing environment or as software as a service ("SaaS"). In addition, at least some of the operations may be performed by a group of computers (as examples of machines including processors), with these operations being accessible via a network (e.g., the Internet) and via one or more appropriate interfaces, e.g., an application programming interface ("API").

Definitions

For purposes of this disclosure the following terms have a meaning with respect to the described methods and techniques as follows:

Listen window ("LW")—that period of time that nodes are awake and listening. The listen window is greater than or equal to, and fully encloses, the synchronization window.

Synchronization window ("SW")—that period of time that nodes are awake, communicating and listening for communications from other nodes in the network.

Guard Interval ("GI")—that period of time from the start of the listen window time to the start of the synchronization window time period.

Useful message—that part of a message that conveys useful information to the recipient and is not used in facilitating the transport of the message through the network.

Message Frame—a frame designed to convey a useful message.

Synchronization frame—a frame designed to convey mesh synchronization and control information.

Synchronization Interval—the time between successive time periods in which the network nodes are scheduled to wake up and send and receive network frames.

Message overhead—all other message bits transmitted that are not defined as useful to the application, including any and all bits used for message management during message transport.

Useful Message Power—total power cost, per bit, of sending a useful message.

Neighbor Node—a network node, designated as such, based on node proximity and/or link quality.

Neighbor Table—a table of neighboring network nodes determined to be proximate to a network node.

Message Receipt—indication that a particular message has been received which may also include the time the message was received or the age of the message in relation to other messages.

Message Receipt Table—a table of message receipts.

Forwarding Probability—the probability that any given message will be selected for rebroadcast by any given node.

The notion of a useful message may be described as that part of a message that conveys useful information to the recipient but that is not used in facilitating the transport of the message. That is, all protocol and routing bits are not defined as useful even though they may be required for routing. Such bits are referred to as "message overhead" bits. FIG. 2A depicts an example embodiment of a message format for a mesh network in accordance with the techniques described in this disclosure. In the illustrated embodiment network message 200 includes a message frame 201 comprising message overhead bits 202, such as protocol and routing bits, and a message payload or useful message 203.

Synchronized Communications

Figure 2B:
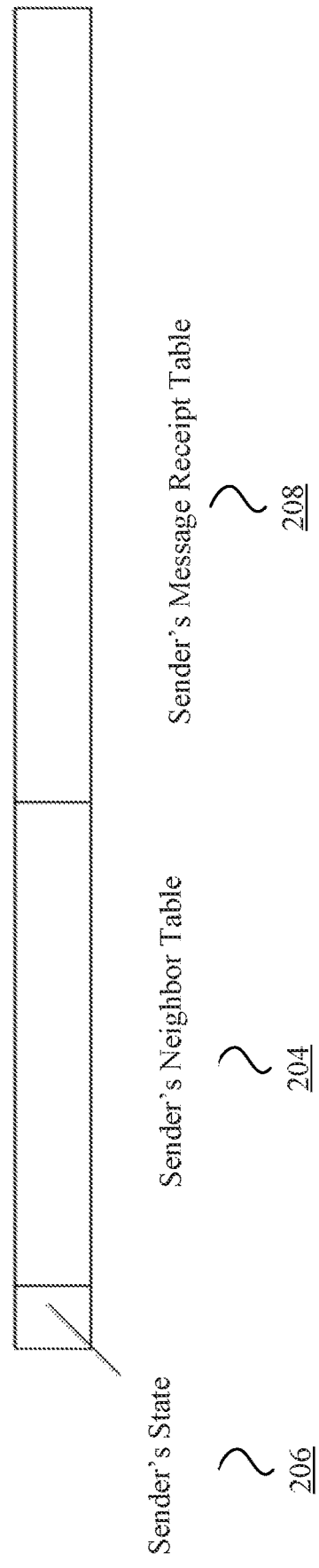
FIG. 2B depicts an example embodiment of a synchronization frame format for a mesh network in accordance with the techniques described in this disclosure.

It is important that synchronization of network node communications be coordinated among the nodes in the network. Synchronization allows nodes to power down between synchronization windows. Synchronization frames may be used for maintaining synchronization among neighboring nodes in communication over a mesh network. FIG. 2B depicts an example embodiment of a synchronization frame format for a mesh network in accordance with the techniques described in this disclosure. Synchronization frame 205 includes a frame type designator 206, a sender's neighbor table 204, and a sender's message receipt table 208. In some embodiments the sender's message receipt table 208 may be omitted.

Synchronized clocks internal to the network nodes (not shown) can be used to compensate for any frequency drift error between the internal clocks of two network nodes communicating on the network. It is well known that temperature is the primary factor in frequency drift error for clocks that utilize crystal oscillators/resonators or silicon-based microelectromechanical systems ("MEMS") oscillators/resonators. With frequency drift error, over time the internal clocks of any two network nodes will eventually move completely out of synchronization and no longer be able to communicate. It is possible to use low-cost, low-power oscillators/resonators for measuring short time intervals with sufficient accuracy. Low-frequency oscillators/resonators are suitable because current consumption can increase significantly with higher-frequency oscillators/resonators. Tuning-fork crystals, for example, typically have a lower frequency range of 10 kHz to 200 kHz in fundamental mode and a maximum drive level of 1 micro-watt ($\mu$W) which can make tuning-fork crystals a good choice for use as a low-power crystal oscillator in accordance with the techniques described in this disclosure. Software can additionally be used to reduce frequency drift error by correcting measured frequency values based on the manufacturer's calibration, for example. MEMS oscillators/resonators with low frequency drift (e.g., 5 ppm or less) can also be used in place of crystal oscillators/resonators with at least certain of the embodiments described in this disclosure.

Whether by using low-frequency crystal/MEMS oscillators/resonators, software techniques, or combinations thereof, it is possible to reduce frequency drift down to 5 ppm (parts per million) or less. A frequency drift of 5 ppm provides a worst-case frequency drift between any two clocks on the order of 5 milliseconds over an interval of 20 minutes. Therefore, the maximum frequency drift error between any two communicating network nodes on a synchronization interval of 20 minutes may be constrained to 10 milliseconds (double that of each individual node). By limiting the maximum radio sleep time to approximately 20 minutes, a maximum synchronization window divergence of only 10 milliseconds can arise in response to the clock drift error between two communicating network nodes, which can be easily mitigated in the mesh design using a guard interval, for example, as set forth in detail below.

The network nodes on the mesh network can be adapted to broadcast synchronization frames 205 to their neighbor network nodes. In one embodiment each network node can be configured to broadcast one synchronization frame 205 for each synchronization interval. The synchronization frames 205 provide certain detailed information regarding the most recent message frames received from any given neighbor in the mesh network. Synchronization frames 205 may also include "state information" of a network node that can be communicated to the other nodes on the network. The state information may include timing information for network node synchronization and may also include a network node's neighbor table.

Providing the state information within synchronization frames 205 allows neighbor network nodes to (i) maintain basic information and coordinate message delivery among network nodes (ii) make rebroadcast decisions such that there is a reduction in overall message replication in the network, and/or (iii) improve network bandwidth by not forwarding network messages in cases where a message is statistically more likely to be forwarded by at least one of the node's neighbor nodes, and thus can be safely dropped. Network messages that are received can also be buffered in a pending message queue in memory and can be flagged in the pending message queue as having already been received by a particular network node (and therefore not worthy of rebroadcast). This determination can be based on statistical probability.

Also important is determining which nodes are neighboring nodes (what nodes can be heard on the network). This may be determined based on the node's proximity or based on the quality of the communications link between nodes. Accordingly, and in some cases, nodes may just ignore other nodes even though they may be able to hear their network traffic.

Provided in this present disclosure is a description of an example system for implementing the improved flood fill mesh radio network as set forth in this disclosure. Although certain elements may be depicted as separate components, in some instances one or more of the components may be combined into a single device or system. Likewise, although certain functionality may be described as being performed by a single element or component within the system, the functionality may in some instances be performed by multiple components or elements working together in a functionally coordinated manner.

In addition, hardwired circuitry may be used independently or in combination with software instructions to implement the techniques described in this disclosure. The embodiments are not limited to any specific combination of hardware or software. The described functionality may be performed by custom hardware components containing hardwired logic for performing operations, by general-purpose computer hardware containing a memory having stored thereon programmed instructions for performing operations, or by any combination of computer hardware and programmed components. The embodiments may also be practiced in distributed computing environments, such as in a private or public cloud network, where operations may be performed by remote data processing devices or systems that are in communication with one another via one or more wired or wireless networks.

In at least certain embodiments the system comprises a mobile communications device configured for implementing a network node in a mesh network. The mobile communications device may include a processor, memory, internal clock, and a network interface for communicating over one or more wired or wireless computer networks. The mobile communications device may also include a radio for communicating with a plurality of network nodes over a wireless radio network. Each network node on the wireless radio network may be configured to communicate only with its correspondent network nodes via broadcast network messages. Each network node may be configured for rebroadcasting network messages it receives to its correspondent network nodes on the wireless radio network. In one embodiment, this can be performed without requiring any addressing scheme or network routing protocol.

In addition, the following processes and/or techniques can be used with various aspects of the improved flood fill mesh radio network described in this disclosure. It is noted that the methods and processes described below are exemplary in nature and are provided for illustrative purposes, and not intended to limit the scope of the disclosure to any particular example embodiment. For instance, processes in accordance with some embodiments described in this disclosure may include or omit some or all of the operations described below, or may include operations in a different order than described. The particular processes described are not intended to be limited to any particular set of operations or order of operations exclusive of all other potentially intermediate operations or different ordering of the operations. In addition, the operations may be embodied in computer-executable code, which may be adapted to cause a general-purpose or special-purpose computer hardware to perform certain operations. In other instances, these operations may be performed by specific hardware components or hardwired circuitry, or by any combination of programmed computer components and customized computer hardware and/or circuitry.

In at least certain embodiments, a process for implementing a mesh network at a network node comprising a mobile device that includes a processor, a memory, an internal clock, and a radio for communicating with a plurality of network nodes over a wireless radio network. Each network node on the wireless radio network may be configured to communicate only with its correspondent network nodes via broadcast network messages. Each network node may also be configured for rebroadcasting network messages it receives to its correspondent network nodes on the wireless radio network. In one set of features, the techniques described in this disclosure can perform these operations without requiring any addressing scheme (particularly a static addressing scheme) or network routing protocol.

Figure 3A:
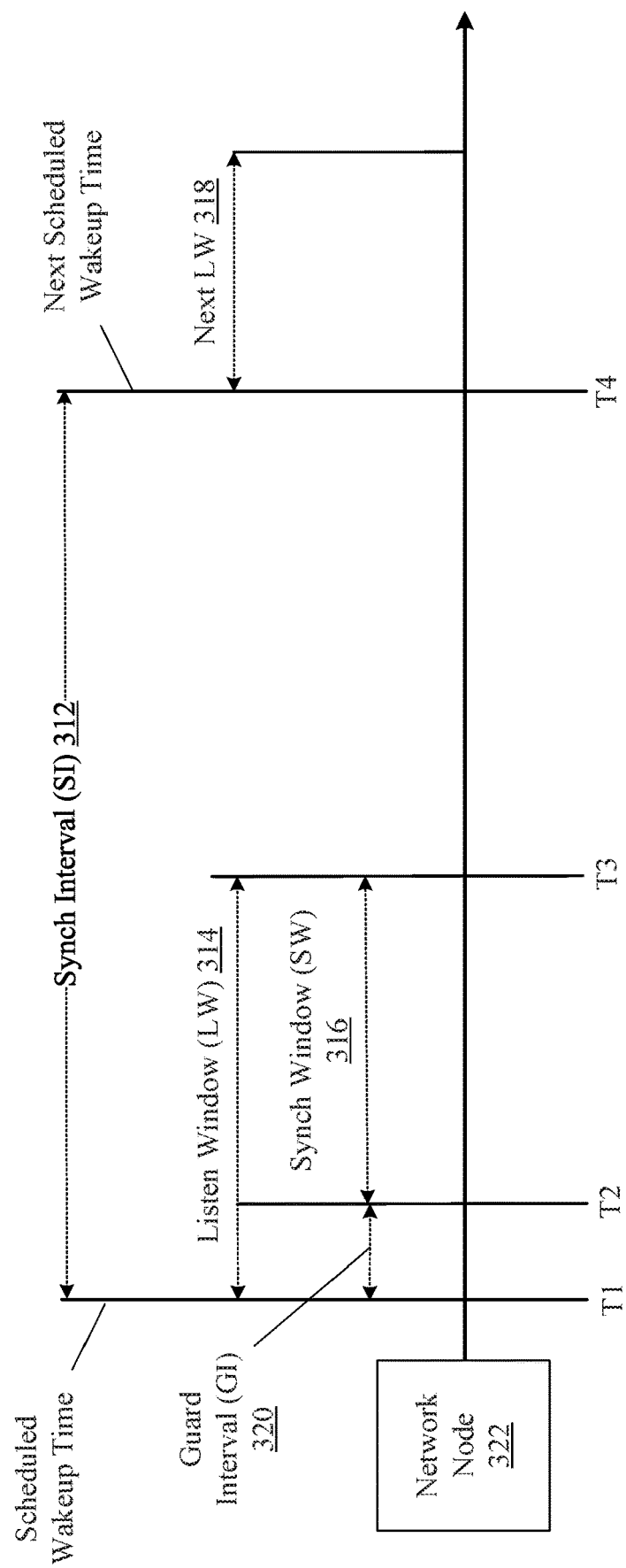
FIGS. 3A-3B depict conceptual timing diagrams of example embodiments of a process for synchronizing nodes in a mesh network in accordance with the techniques described in this disclosure.
Figure 3B:
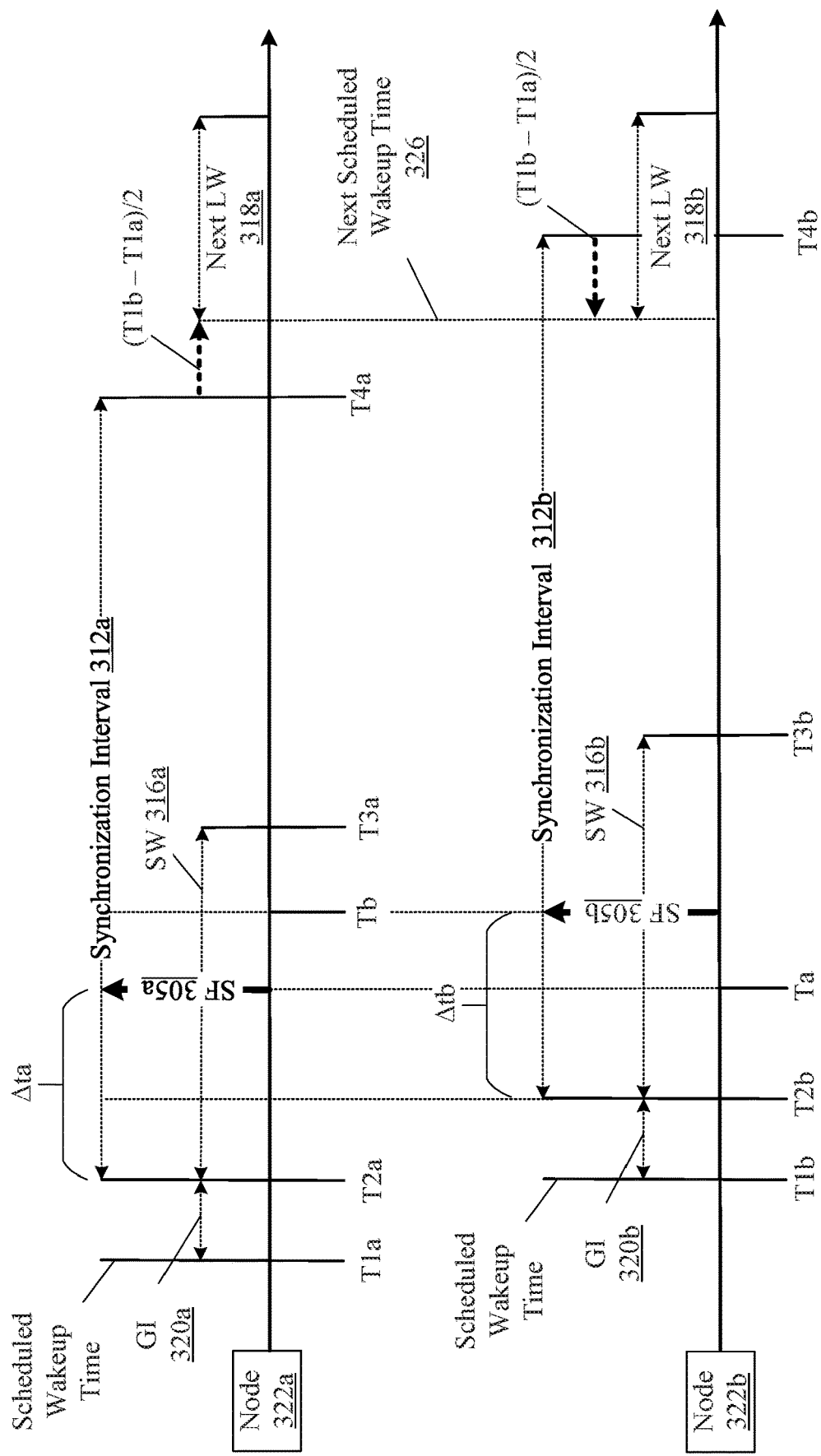

In one preferred embodiment there are no centrally generated clocks and each node derives its own synchronization time in relation to its neighbors for distributed time synchronization. FIGS. 3A-3B depict conceptual timing diagrams of example embodiments of a process for synchronizing nodes in a mesh network in accordance with the techniques described in this disclosure. In the illustrated embodiment of FIG. 3A the synchronization process 300 for network node 322 includes a synchronization interval 312, a listen window 314, a guard interval 320, a synchronization window 316, and a next synchronization window 318 representing a subsequent synchronization cycle. The synchronization interval 312 represents the time interval between successive periods in which the network nodes are scheduled to wake up and communicate. The radio does not need to listen all the time. When a network node is first turned on, it may listen for network traffic for the duration of the listen window 314 time period. The listen window 314 may be configured to have a duration that is long enough to ensure network nodes receive any network messages from their correspondent nodes that are already participating in synchronized communications on the network. If there are no correspondents in range, then a network node can simply start operating its own listen window 314 and synchronization window 316, and wait for the next participant to join in the communication on the network. But if there are network nodes already communicating on the network, a newly joining network node may simply synchronize with the existing group of correspondent nodes.

Synchronization frames 205 can be used to self-synchronize the nodes in the mesh network, as well as to synchronize each node with its neighbors. In at least certain embodiments the synchronization frames 205 may be configured to establish parameters for the listen window 314, for instance to facilitate acknowledging receipt of synchronization frames from correspondent nodes. Each correspondent node runs its own internal own clock and no two clocks are exactly the same. Synchronization frames may serve to inform correspondent nodes of the timing when its correspondents started their respective listen windows 314.

Each network node 322 can adjust its own start time for its next listen window 318 to account for any difference in timing between communicating nodes. In one embodiment the next listen window 318 can be set to an average value for the collective node clocks participating in a group of correspondent nodes (based on maximum clock drift between any two network nodes). These settings can change over time as the network and its traffic evolves.

Synchronization frames are important for timing because they include offset timing (delta) from the beginning of the synchronization window until the time a node communicates its synchronization frame onto the network. In certain aspects this information is included in the network node's state information loaded into the synchronization frames at transmission. Network nodes 322 may obtain this offset information from the synchronization frames received from their neighboring nodes, and calculate the time period for the synchronization interval 312 by relating the offset timing the network nodes receive from their correspondents with their own offset. And they may do so recursively each time a new synchronization frame is received. In at least certain aspects each network node can be configured to communicate one synchronization frame per synchronization window 316 to its neighboring nodes. In some cases the synchronization of the nodes communicating on the network may be configured to converge within two or three cycles.

Any synchronization frames 205 may be specified to arrive at times within the synchronization window 316 from time T2 to time T3. T2 refers to the time at which the synchronization window 316 commences for the network nodes 322 and T3 refers to the time at which the synchronization window 316 closes. T3 minus T2 therefore defines the synchronization window 316. Each neighbor node 322 can thereafter adjust its own start time for the next synchronization window (or next scheduled wakeup time T4) based on the synchronization frame in order to synchronize the nodes communicating on the network and to account for clock drift between any two network nodes.

In addition, because oscillators/resonators are only accurate within a certain bound, a guard interval 320 can be used to compensate for the temperature drift between internal clocks of nodes communicating on the network. In FIG. 3A the guard interval 320 is shown as the time interval between T1 and T2. T1 refers to the scheduled wakeup time for the network node and T2 refers to the time at which the synchronization window 316 commences at the end of the guard interval 320. A guard interval refers to a (relatively short) time interval to allow for a certain degree of frequency drift error (also referred to herein as clock drift or clock jitter) between the respective internal clocks of any two adjacent nodes communicating on the network. The guard interval 320 can be used by network nodes 322 to wake up and broadcast their respective synchronization frames before the start of the synchronization window 316 begins. In certain features the duration of the guard interval 320 may depend on the length of the synchronization window 316 and/or synchronization interval 312.

In one embodiment the guard interval 320 can be set to double the anticipated clock drift error between any two communicating nodes. This can be useful in worst cases where the frequency drift of the internal clock of one of the communicating network nodes is in the opposite direction as the frequency drift of the internal clock of the other communicating network node. Thus the guard interval 320 can be configured such that all other neighbor nodes 322 on the network are relatively certain to wake up within the guard interval (plus or minus). Doubling the frequency drift error ensures sufficient time for all nodes to wake up and broadcast their synchronization frames within the guard interval 320.

In reality, and depending on the number of neighbors, it is not a calamity if clock drift is more than the guard interval 320. Any given neighbor's synchronization frame only has a low probability of being broadcast at the start of the synchronization window and multiple neighbors provide multiple opportunities to resynchronize. For this reason, the guard interval 320 may be configurable and may be tuned as part of system development to best suit application circumstance.

A synchronization timer (not shown) can be set internally by each network node with a value between T2 and T3 to initiate its listen window 314. In one embodiment the listen window 314 can be configured to start before the synchronization window 316 by the duration of the guard interval 320 to compensate for the maximum anticipated clock drift between the internal clocks of any two communicating nodes. The duration of the listen window 314 can be set beforehand (e.g., predetermined) or it can be dynamically determined between communicating nodes over time. The listen window 314 may expand over time to alleviate collisions. It may also contract over time to reduce redundant listening time.

FIG. 3B depicts conceptual timing diagrams of an example embodiment of a process for synchronizing nodes in a mesh radio network in accordance with the techniques described in this disclosure. Each of the network nodes 322a and 322b communicating on the wireless mesh network according to embodiments described herein can adjust its own synchronization intervals 312 to synchronize with its correspondents on the mesh network. In the illustrated embodiment, network node 322a is shown to have a scheduled wakeup time at T1a and a synchronization interval 312a that expires at time T4a. T4a is the scheduled beginning of the next listen window cycle 118a. Network node 322b is shown to have a scheduled wakeup time at T1b and a synchronization interval 312b that expires at T4b. T4b is the scheduled beginning of the next listen window cycle 118b.

In operation at T1a, network node 322a wakes up and initiates its listen window timer (not shown). In at least certain embodiments this may also refer to a synchronization window timer or a guard interval timer, or any combination thereof. At some time lapse Ata after node 322a wakes up, a synchronization frame SF 305a is broadcast by node 322a to node 322b on the mesh network which is received at node 322b at time Ta. Note, any transmission delays due to network delays and signal quality have been ignored for purposes of this explanation, but persons of ordinary skill in the art would understand that network transmission delays would also be accounted for and addressed accordingly in a real-world design. Also note, synchronization frame SF 305a is communicated after the expiration of the guard interval 320a but before time T3a which is the end of node 322a's synchronization window 316a. Requiring network nodes to at least attempt to communicate their respective synchronization frames within the synchronization window 316 enables node synchronization while at the same time reduces power consumption.

At the time node 322a broadcasts its synchronization frame SF 305a, it may load its state information therein. In a preferred embodiment the state information may include the time difference between node 322a's scheduled wakeup time T1a and the timing of node 322a's broadcasting of its synchronization frame SF 305a at time Ta. Once the synchronization frame SF 305a is received by network node 322b, the time difference between node 322a's scheduled wakeup time 324a and the timing of node 322a's broadcasting of SF 305a (the time delta ta) can be extracted from the frame and used to calculate the duration of the synchronization interval 312b and to schedule the next wakeup time 326 for node 322b. In particular, from the state information extracted from SF 305a, node 322b can compare node 322a's scheduled wakeup time 324a with its own wakeup time 324b to determine the time difference T1b–T1a. In a preferred embodiment, this time difference T1b–T1a can then be divided by two and the resulting time used as the time period for adjusting node 322b's synchronization interval 312b.

As shown, if network node 322a's scheduled wakeup time occurs before network node 322b's scheduled wakeup time, then the timing of the synchronization interval time period 112a may be adjusted by network node 322a subtracting one-half of the calculated time difference T1b–T1a from its synchronization interval time period 312a and broadcasting at a time sooner by that amount for the next cycle. But if network node 322a's scheduled wakeup time occurs after network node 322b's scheduled wakeup time (not shown), then the timing of the synchronization interval time period 112a may be adjusted by network node 322a adding one-half of the calculated time difference T1b–T1a to its synchronization interval time period 112a.

Similarly, the process may be conducted for network node 322a except that the timing of the synchronization interval time period can be adjusted in the opposite direction as shown in the illustrated embodiment of FIG. 3B. The respective scheduled wakeup times for the network nodes can then be scheduled accordingly. The state information may also include node 322a's scheduled wakeup time in which case it can be extracted directly from the synchronization frame and used to calculate the duration of the synchronization interval 312b and to schedule the next wakeup time 326 for node 322b as above.

Likewise, when node 322b broadcasts its synchronization frame SF 305b, it may load its state information therein. Once the synchronization frame SF 305b is received by network node 322a the time difference between node 322b's scheduled wakeup time T1b and the timing of node 322b's broadcasting of its synchronization frame SF 305b (time delta tb) can be extracted from the frame and used to calculate the duration of its synchronization interval 312a and to schedule its next wakeup time 326 for node 322a as above. In this manner, the synchronization between nodes 322a and 322b may be configured to converge within two or three synchronization frames/cycles.

As an illustrative example, a receiving node ("RNode") may be configured to record the time it received a synchronization frame from a broadcasting node ("TNode") and to record the difference between the arrival time of the synchronization frame and the next planned listen window 314 start time. In certain embodiments this can be used by any RNode to derive the timing for the next synchronization cycle 318. When a new synchronization frame arrives the RNode can divide by two the difference in timing between the wakeup time of the RNode as determined by its own internal clock and the scheduled wakeup time of the TNode as determined from the TNode's state information in the synchronization frame and the receipt time of the synchronization frame.

In one embodiment the state information in the synchronization frame includes the time difference (delta) between the TNode's scheduled wakeup time and the time the TNode broadcasted its message onto the network. If a new synchronization frame is received, the RNode can determine the synchronization interval 312 based on comparing the TNode's state information in the synchronization frame with its receipt time. The RNode can then determine the time difference and then add (or subtract) the time difference to its synchronization interval to compute the next scheduled wakeup time for the RNode to initiate its next listen window 318 in the next synchronization cycle. This sequence can be performed recursively for each subsequent synchronization interval to synchronize clocks and to minimize clock jitter between the nodes communicating on the network. In embodiments, this methodology may be configured to converge within two or three synchronization frames 205.

When new network nodes 322 come along that do not know the synchronization interval 312, they can wait and listen with radio on for the duration of the listen window 314.

Minimizing Power Consumption

In a network node the power cost of each useful message can be expressed as a number of watts (W) per bit of useful information. Thus, if it takes 1 W to broadcast a 100-bit useful message this is a power cost of 1/100 watts per bit. There are a number of things that can affect the useful message power, including the physical design of the radio and antenna, the routing protocol overhead involved in delivering the useful message to the intended recipient, and the channel utilization for reaching multiple correspondent nodes. The two primary sources of power cost include the radio for transmitting and receiving network messages and the microcontroller for processing those network messages. For any given radio there are two principal ways to reduce the power cost of delivering a network message: by ensuring the radio is off for as much time as is possible and by reducing the routing protocol overhead required for network message delivery. When a radio is off, it is not listening for network traffic, and thus is not using any power during that period. But radios cannot receive transmissions from correspondents until power is restored. A fundamental problem with turning off the radio is knowing when to turn it back on again to send and receive new messages.

In line with this, taking a variation of 5 ppm as a typical or representative example maps to a clock variation of plus or minus 6 milliseconds over 20 minutes (20×60×1000=1, 200,000 milliseconds). Thus, when using a clock chip with a guard interval 320 of 6 milliseconds, the maximum time a node could be asleep and remain synchronized with its neighbors would be 20 minutes. In reverse, if the guard interval 320 is set to plus or minus 5 milliseconds, the synchronization interval 312 can be as long as approximately 18 minutes. This design technique can result in a sleep duty cycle of 99%, thus providing significant energy savings. The longer the synchronization interval 312 is constructed in relation to the synchronization window 316 and the guard interval 314, the more energy savings can be realized. The downside is a negative impact on data rate because network messages can only be communicated while network nodes are awake. But for many IoT applications, this is acceptable since sensors do not need to send and/or receive a constant stream of data to be used effectively. For instance, in a sensor network, one node may be measuring temperature, another air pressure, and a third air flow.

In aspects, each network node may include a pending message queue (not shown) and may be configured to broadcast network messages at the head of a pending message queue. The network node can thereafter move messages that have been broadcast to the tail of the pending message queue after transmission. Synchronization frames 205 and message frames 201 received from the correspondent network nodes can be loaded into the pending message queue. The synchronization frames from correspondent nodes can be used for determining the next listen window 118 start time and for updating the status of message frames 201 in the pending message queue.

FIG. 4A depicts a flow chart of an example embodiment of a process for synchronizing network nodes in a mesh network in accordance with the techniques described in this disclosure. In the illustrated embodiment, process 400A begins at operation 402 wherein a network node in the mesh network performs a power on (or reset) function. Then, at decision block 404 the network node begins listening for synchronization frames on the network. The network node also initiates a listen window timer at operation 406. In one embodiment, the listen window timer can be set simultaneously upon performing the power on function. If no synchronization frames are received during the listen window the network node can repeat operation 404 until a synchronization frame is received or the listen window expires. If the listen window expires the radio can go back into sleep mode until the start of the next listen window. When the listen window time period closes, the radio can power down (stop listening) and set a sleep timer for a power-off interval before the next cycle begins (operation 408).

The pending message queue for each network node can be scanned and any messages can be passed up the message receive stack. Any messages that have been seen before or marked as "received" can be deleted to prevent re-transmission. Additionally, any messages marked as timed out (optional only if TTL is used) can also be deleted. This completes process 400A according to one example embodiment of the techniques described in this disclosure.

Figure 4B:
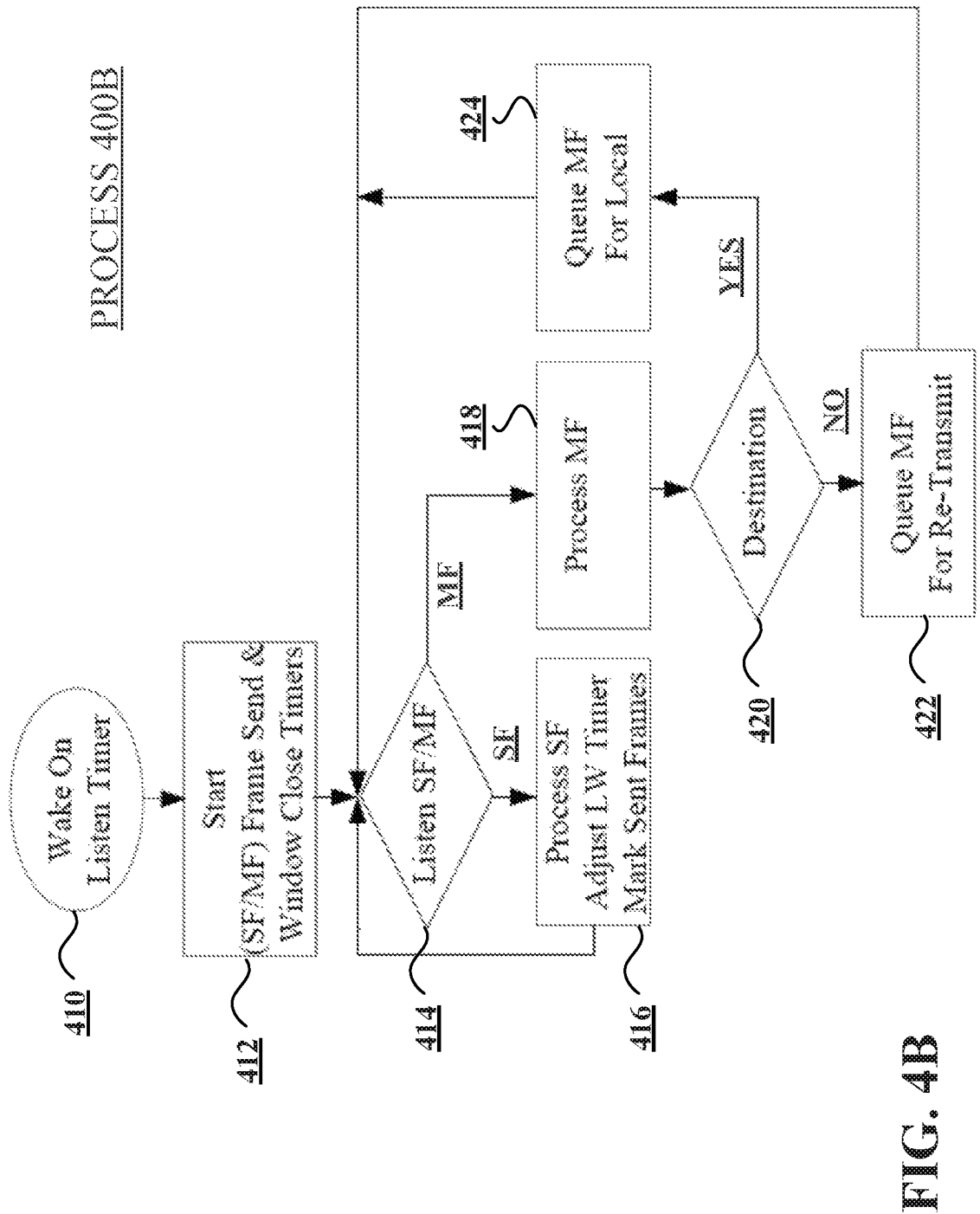

FIG. 4B depicts a flow chart of an example embodiment of a process for synchronizing network nodes in a mesh network in accordance with the techniques described in this disclosure. In the illustrated embodiment, process 400B begins at operation 410 in which a network node in the mesh network wakes up upon the expiration of the previous synchronization interval. Network nodes can be configured to wake up according to a scheduled wakeup time. The network nodes can also set a timer to initiate the listen window. At operation 412, the network node can thereafter start broadcasting synchronization frames and message frames to its correspondent nodes. At decision block 414, the network node listens for any synchronization frames and message frames communicated from its correspondent nodes on the network. If a synchronization frame is received, at operation 416 it can be processed, and the listen window timer is adjusted accordingly. Sent frames are also marked as such in operation 416. Process 400B then continues back to decision block 414 wherein the node listens for additional synchronization frames and message frames from its correspondent nodes and the process repeats until additional ones are received.

If a message frame is received process 400B continues to operation 418 wherein the message frame is processed. At operation 420 the network node determines whether it is a destination node for the network message. If so, the message frame can be queued locally at operation 424 for processing and process 400B reverts back to decision block 414 in which the network node can continue listening for additional network traffic. But if not, process 400B continues to operation 422 wherein the message frame is queued for retransmission via rebroadcast message to its correspondents on the wireless mesh network. Process 400B reverts again back to decision block 414 and repeats as appropriate. This completes process 400B according to one example embodiment.

Each synchronization frame can provide a mechanism to ensure that the message has been received by other nodes and that it does not stay in circulation longer than necessary (which can be predetermined or dynamic). Synchronization frames can be configured to supply the details of the most recent frames seen by any given neighbor node. In one preferred embodiment, this information can be used to determine if a sufficient number of neighbor nodes have marked a pending message as 'seen' in their respective pending messages queues to identify messages that are not worthy of re-transmission. Probability can be used to determine if a sufficient number of neighbor nodes have seen a given message. If the number of neighbors that have seen a message is greater than some number of the nodes that are currently visible on the network, the receiving node may delete the message on the basis that using the same algorithm at each correspondent node will result in a high probability the message can be expected to propagate from one or more neighbors to all network nodes that have not yet seen the message.

The synchronization frames can also provide a mechanism by which the broadcast of a single message from a forwarding node may be simultaneously received and acknowledged by all receiving nodes without any additional protocol transmission costs other than the single window synchronization frame.

Radio Frequency Collisions

Nodes are constantly listening, and when nothing comes in, they can transmit. But even under this paradigm, network messages may still collide if a neighboring node is broadcasting over the same channel at the same time. A RNode may thus not receive a particular message because it collided with a message the RNode was broadcasting at the time. Conventionally, in such cases the RNode would wait and "back off" until it received the message, and then the RNode would attempt to broadcast its message frame again. Carrier sense multiple access with collision avoidance ("CSMA/CA") is a well-established technique used to listen for radio frequency ("RF") carriers just prior to broadcasting a frame and then back off for an interval before trying again. This is a proven technique for handling collisions. But one of the effects of using a synchronized broadcast window is that all the communications that would have happened over an extended interval are now compressed into a much shorter synchronization interval, significantly increasing communications density. This combined with the increased traffic required to communicate other messages besides a network node's own message frames can result in network traffic density easily exceeding the ability of standard CSMA/CA mechanisms to cope.

In addition, the RNode can keep this process going in a recursive loop until the message can be communicated over the network which can burn a lot of power and is completely non-deterministic. There's also the hidden node problem—when nodes cannot handle more than one message at a time, so if two separate nodes broadcast a message to a third node, the messages can experience a collision regardless of instituting any back-off protocol. In at least certain embodiments, since there is no single arbiter of the synchronization window or individual node transmission times, each node can individually communicate its message frames at different times within a broadcast window. In a preferred embodiment, each node may use random numbers to decide when to broadcast during a broadcast window as discussed previously.

The synchronized communications techniques described herein can be adapted to include broadcast interval randomization. Because frames are broadcast to all correspondent nodes, in a well-balanced mesh network there is a high probability that any collision involves a frame that has already been communicated via a different node. Instead of retrying the current transmission, it can simply be terminated and re-queued to be broadcast later in the same synchronization window or the next window. This provides a very simple, and deterministic, method for relinquishing the channel in the face of collision. Any collision in one synchronization window is unlikely to be a collision in a subsequent synchronization window.

The described techniques embrace the fact that collisions occur at times and will need to be dealt with. Probability can also be used for solving the collisions problem. In one aspect, the synchronization frame broadcast time can also be distributed randomly within the synchronization window for both the nodes communicating on the network. The synchronization frames from a particular node can therefore be communicated at any time in a random scatter of probabilities for synchronized transmission. With this feature, each pair of communicating nodes can be adapted to broadcast synchronization frames randomly within the synchronization window. While collisions may still occur, the probability of collisions is substantially reduced because it would require two adjacent nodes to be broadcasting at exactly the same randomly selected time within the synchronization window, which is substantially unlikely.

In at least one embodiment, the same randomness can be used not only for communicating the synchronization frames but also for communicating the network messages as well. That is, useful messages can be broadcast randomly in the same manner as randomly broadcasting the synchronization frames during the synchronization window as described previously. In other aspects nodes can detect a collision and determine it doesn't care it collided and just communicate the message again on the next synchronization interval, or reschedule another random time to rebroadcast in the current window—i.e. rebroadcast the message again randomly or wait until the next synchronization window and broadcast it randomly again. Nodes can broadcast one random message, two messages, or any number of random messages within each synchronization and/or useful message window. The message time is not the same but moves around from one frame to the next, which makes it significantly unlikely there will be a collision.

In practice however this limitation is not generally significant for the types of applications for which this mesh network is best suited. As mentioned, the majority of messages have multiple paths and the probability of requiring rebroadcast is low. However, where deemed necessary, it is possible to reschedule a second synchronization frame within any remaining synchronization window time period to expedite the communication of certain new or priority messages.

These methods together provide the ability to successfully flood-fill a mesh network of nodes with (i) reduced power (radio traffic can be off for significant percentage of time and radio duty cycles of <0.1% are typical; protocol overheads are <4% per 128 byte frame) (ii) reduced resource requirements (memory requirements persist only as long as it takes to move a message out of a node's immediate RF region, and (iii) reduced channel utilization (the ability of the radio to allow frames to be broadcast with reduced frame rebroadcasts and to reduce useful message replication at the recipient node with minimal overhead).

Message Removal

In one embodiment, messages are not queued or rebroadcast; they are for local node (nodes in range) consumption only. Received data messages fall into two categories (i) messages destined for the receiver and (ii) messages destined for another node. Any messages destined for the receiver are handled by the receiver. When the receiver is done with them, they are either returned to the message free list for reuse, or, if the message is a broadcast message, queued for rebroadcast (forwarding). For messages destined for another node, any messages that are not addressed to the node are queued for forwarding. Messages queued for forwarding may be scheduled to be sent at a randomly allocated time slot during the next synchronization window. After a message is broadcast, it may be discarded. In one aspect, each message is broadcast (or rebroadcast) by each network node only once. In such cases, duplicate message transmissions occur only because multiple nodes may forward the same message.

Probability Forwarding

Message frames waiting to be forwarded in a network node's pending messages queue may be arbitrarily removed by the method of probabilistic frame rebroadcast reduction referred to herein as "probability forwarding". This process determines the need for message rebroadcast based on the number of neighbor nodes within range and the intended destination of the message. When flood filling a dynamic network of highly mobile network nodes to reach a specific node there is no prior knowledge of the network topology that can be used to optimize delivery. Thus, in flood fill mesh networks, topology information cannot generally be known beforehand. However, it is possible to improve the flood fill technique for dynamic topologies by allowing any given node to choose not to forward certain messages. In at least certain aspects, network nodes in a mobile mesh network have a dynamic topology wherein sometimes network nodes are located in a densely populated region of the network and other times they can be on their own or within range of only one or a few other network nodes. In the circumstance where a node is in the middle of a densely populated part of the network, it is not necessary for every node to forward every message. In such circumstances, it is only necessary for a sufficient number of the nodes to forward a sufficient number of messages such that all, or nearly all, messages are forwarded to all nodes.

The forwarding probability can be defined as a real number in the range between 0 and 1 or as a percentage in the range between 0 and 100 percent. This determines the statistical probability that a message received by any given node will be forwarded on by that node. The application of the forwarding probability process provides a mechanism by which nodes can choose not to forward certain messages. Any set of network nodes within range of each other can choose to rebroadcast a randomly selected subset of the pending message queue. In one embodiment, the rebroadcast subset size may be inversely proportional to the number of neighbors. This technique can improve network bandwidth efficiency by reducing the number of redundant broadcasts and resource requirements.

Nodes may be configured to maintain a neighbor table of their immediate neighbors (correspondents) which need only contain the set of "N" nearest neighbors ordered by signal strength or quality (where N is generally less than all possible neighbors). In one embodiment, a sender node's neighbor table enables it to determine whether or not to drop network messages sooner. For example, referring to FIG. 1, if mesh node 2 and mesh node 5 are found to be in mesh node 1's neighbor table, then destination node 3 receiving mesh node 1's synchronization frame can determine that mesh node 1 and mesh node 5 are neighbors and that mesh node 1 and mesh node 2 are neighbors. Thus, when a synchronization frame comes along containing a list of network messages that have already been received by a network node, they can be recorded as already seen. For example, if mesh node 1 sees mesh node 4's synchronization frame that tells node 1 that a message destined for node 3 has already been delivered to node 3 by node 4, then node 1 does not need to rebroadcast that same message since node 3 already has it. If node 1 knows node 3 has it, then node 1 can decide whether to rebroadcast the message again or to drop it. Such decision depends on the local topology of the network and the number of network nodes.

As soon as a sufficient number of network nodes have a particular message, then the question arises whether the message needs to be rebroadcast at all or dropped. This can be determined statistically, i.e., based on the probability that broadcasting the message will be required for the message to arrive at its intended destination, e.g., node 3, when the message may also proceed to the destination node 3 via at least one neighboring node such as mesh node 4. If there are two nodes that have a particular message in the mesh network, then it may not work so well to drop the message, but if there are five nodes that have the message, then the probability becomes much higher that at least one of those nodes will forward the message to its intended destination. The more network nodes that have received the message locally, the greater the probability the message will be relayed to its destination by at least one of them. More particularly, as long as any TTL expiration is set far enough in the future, chances are good that the message will be relayed to its intended destination node by at least one of the other neighboring nodes. Whereas this technique introduces risk that any given message may fail to be delivered to its intended destination, it works well in many applications. For example, in sensor networks because every data transmission is not necessarily needed for the network to be used effectively. Where reliable transport is a requirement, higher network layers can be used as is well defined in the literature.

Accordingly, the embodiments described herein include innovative techniques whereby each network node may be configured to determine the probability of a message rebroadcast (rebroadcast probability) to be inversely proportional to the number of network nodes it corresponds with (neighbor count). The exact nature of the relationship between the broadcast probability and neighbor count is immaterial except to say that one neighbor should always dictate a broadcast probability of 1; and the worst case where a node maintains a broadcast probability of 1 regardless of neighbors is simply the normal flood fill algorithm case.

The broadcast probability in relation to neighbor count can be determined in any practical way, for example, by assessing the incoming message rate and throttling the rebroadcast rate accordingly. In another instantiation, the relationship may be determined by a probability scaled to the number of neighbors and/or the incoming message rate, message priority, and/or some combination thereof. When using a broadcast probability proportional to a neighbor count, the nodes may tend to self-balance the network traffic over time, and the message load can be dynamically and randomly distributed between network nodes. Forwarding probability may vary from 100 percent when a network node is only in range of one other node and may decrease according to a table of values indexed by the number of neighbor nodes. Such table of proportional values may be set/varied by the particular application.

Probability forwarding may be further optimized by the use of "seen" frame information shared by the neighbor network nodes. The number of neighbors that have already seen a given message frame increases the probability that the message will be deleted from the forwarding queue. If a number of neighbors have already seen a message, the probability is higher that a node that has not already seen it will determine that it has been sent from another node. Thus, the probability that any given node forwards it can be lower (but never zero).

In another embodiment, probability forwarding decisions may be inversely biased by the number of neighbors a node has and the relationship of the network nodes with each other, as determined by each node. Having only one neighbor dictates 100 percent forwarding probability and having 20 neighbors dictates a lower probability. In one embodiment, the specific probability may be determined to be such that the sum of the probabilities of each network node forwarding a given message is at least 100 percent across connected neighbors. To achieve this each node calculates its view of each of its neighbors' probability for rebroadcasting each message and ensures that the balance adds up to at least 100 percent when including the node's own forwarding probability for that same message. Knowing if a given node has received a specific message significantly improves the resolution of probability forwarding. Such forwarding probability value may be further biased by neighbors reported communication signal or link quality. If overall signal integrity quality is high, the probability of successful transmission is correspondingly high, and the need for message forwarding may be correspondingly lower. Conversely, if a network nodes signal quality is lower, the probability of successful transmission is correspondingly lower, and the need for message forwarding may be correspondingly higher.

Figure 5A:
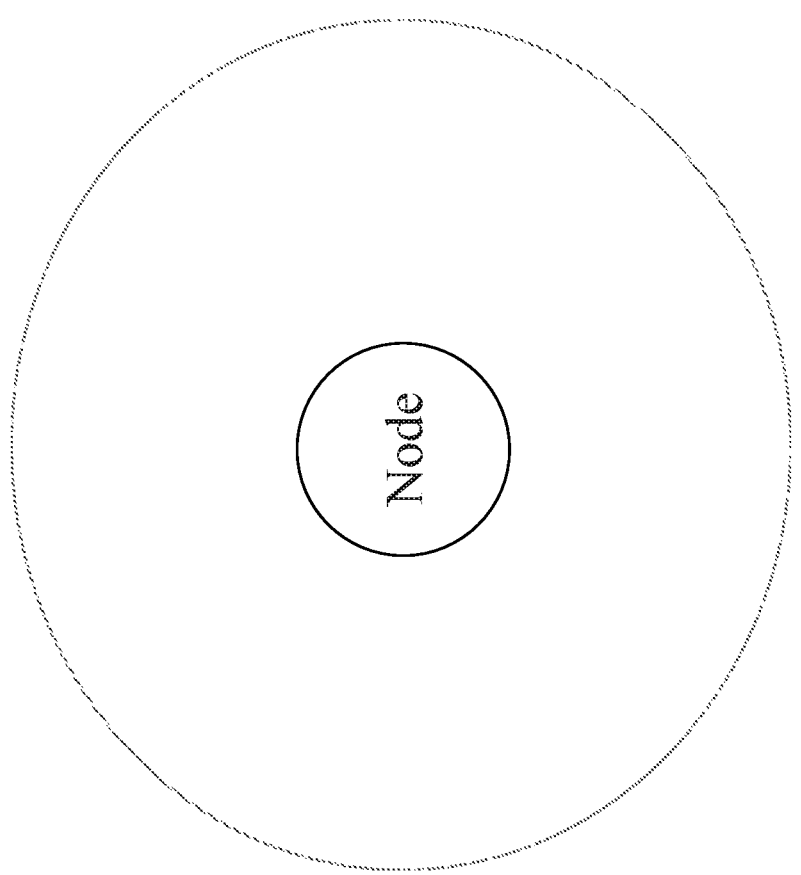
FIGS. 5A-5E depict probability forwarding among nodes in a mesh network in accordance with the techniques described in this disclosure.
Figure 5B:
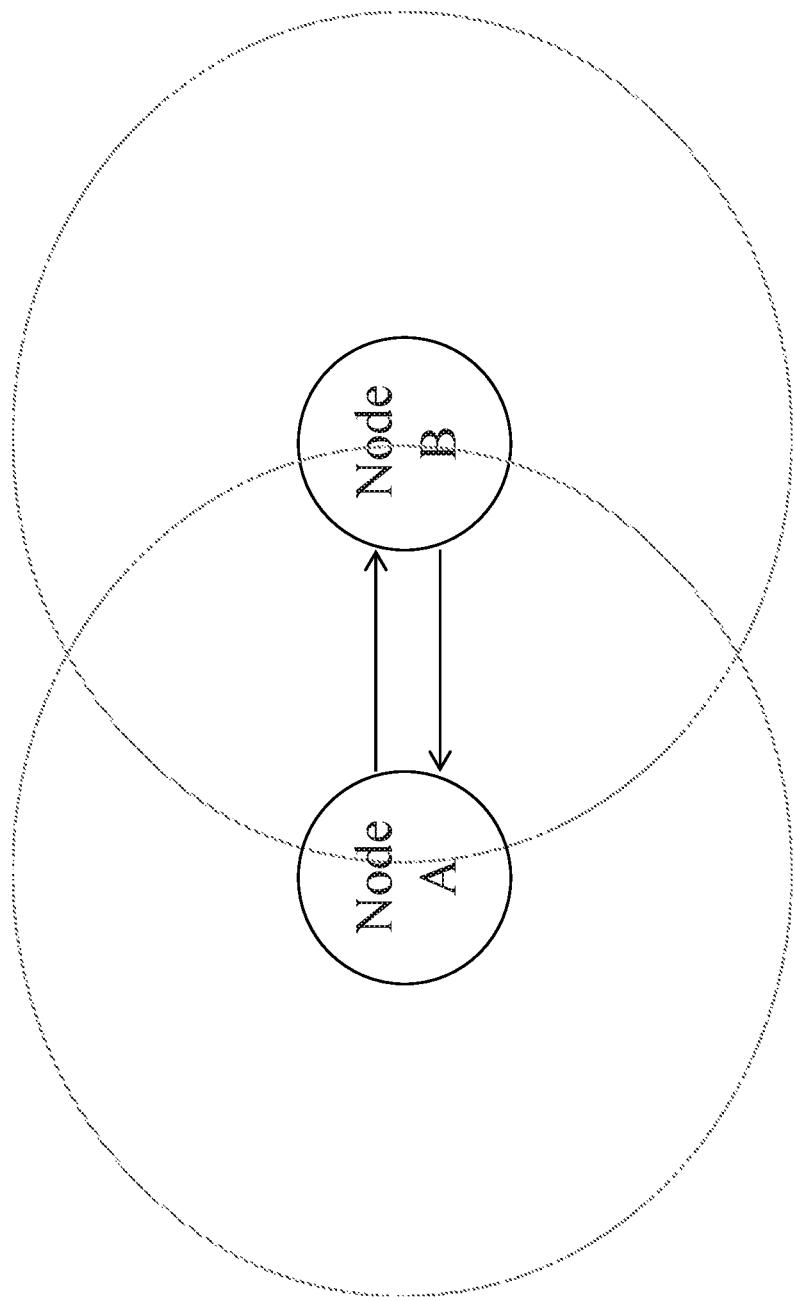
Figure 5C:
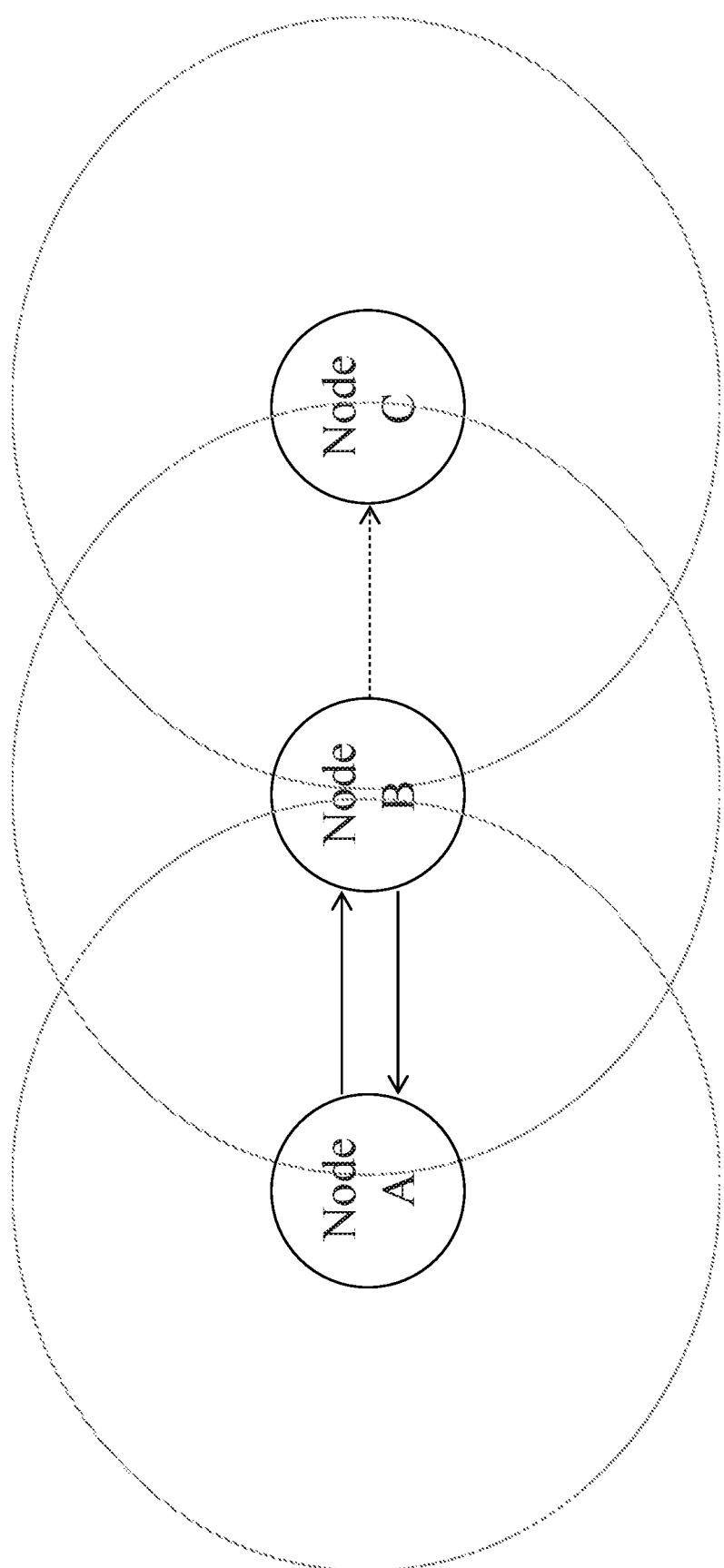

FIGS. 5A-5E depict probability forwarding among nodes in a mesh network in accordance with the techniques described in this disclosure. In one embodiment, a multi-hop meshed network for battery-powered mobile devices may be utilized. In FIG. 5A there is only one network node with no other nodes in range, and so that node does not receive any frames to forward, and thus has a probability forwarding of zero. In FIG. 5B there are two nodes in range of each other. In this case the nodes are in direct communication with all nodes within range, and thus do not receive any frames that are not already available to each other. FIG. 5C depicts three network nodes. In this case, one node is within range of Nodes A and C, but Node B has two nodes within range. Node A and Node C are hidden from each other and have no neighbors besides Node B. Node B may self-assess a forwarding probability of 100 percent since each message received from Node A destined for Node C requires forwarding from Node B, and each message received from Node C destined for Node A also requires forwarding from Node B. Since Node A and Node C have no neighbor nodes within range except for Node B, they each self-assess a forwarding probability of zero.

Figure 5D:
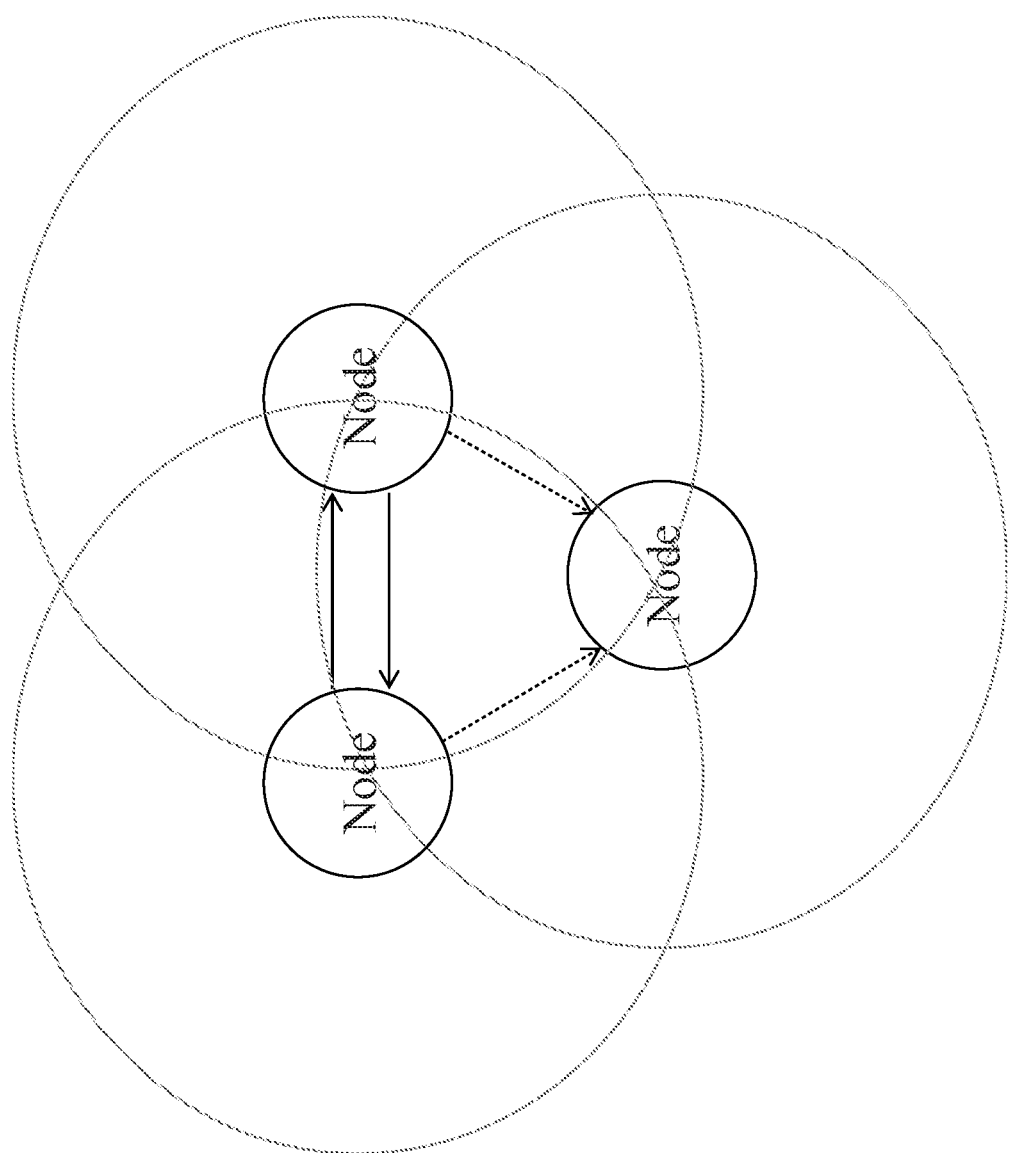
Figure 5E:
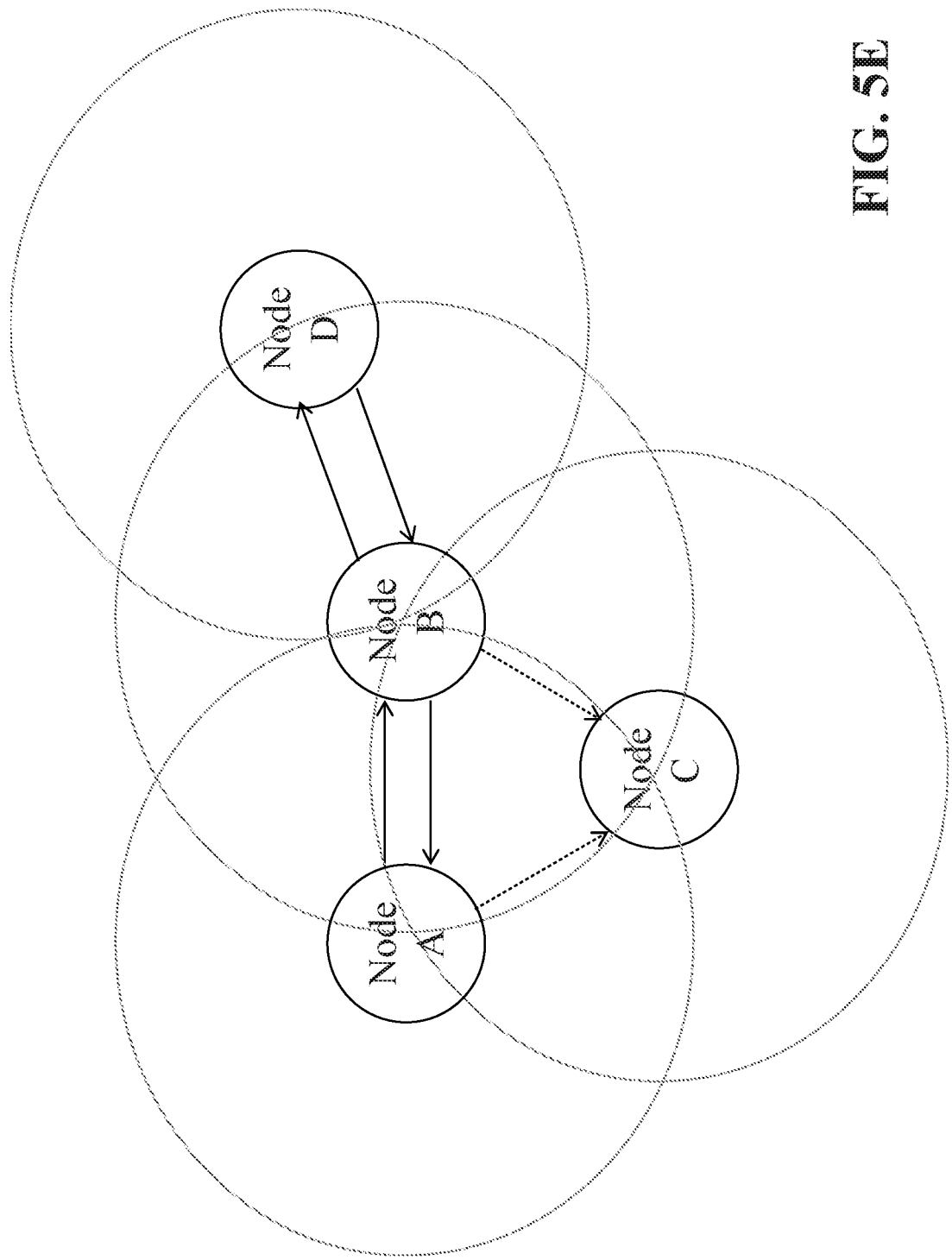

FIG. 5D depicts three nodes with each node mutually within range of two other nodes. In this case each node may determine to selectively forward messages based on a self-assessed probability of 50 percent. The probability forwarding assessment may be based on the inverse of the number of network nodes within range of each network node. FIG. 5E depicts Node B is within range of three network nodes A, C and D. Nodes A, B and C that are mutually within range of two other network nodes. But Nodes A and C are not within range of network node D. Each network node may selectively forward network messages according to its self-assessed probability in accordance with where it resides in the network topology map constructed by each network node, relative to each of its neighbors within range, and derived from the state information extracted from each received synchronization frame. Simplistically, network Nodes A and C may have a forwarding probability of 50 percent (e.g., ½) because they are within range of two other nodes that are each within range of each other (using the inverse of the network nodes within range formula as above), whereas communications from network node D are forwarded by Node B to either Node A or Node C with a forwarding probability of 100 percent. Network node B may determine that Node D is not within range of nodes A and C (and vice versa). Thus node B may forward messages from Nodes A and C to Node D with a forwarding probability of 100 percent to ensure those messages are received by node D, but may forward messages from Nodes A and C to Node B with a probability forwarding of 50 percent (i.e., ½). Node D does not forward any frames since no other nodes are within range. As can be seen, each node has the information required to independently decide as to the disposition of each message in its own forwarding queue. The exact determination may be varied according to specific network needs and characteristics.

In addition, the probability forwarding may be biased up or down based on statistical analysis of network traffic in relation to the network nodes. For instance, the forwarding probability is biased to account for any indeterminacy in radio frequency (RF) transmission or risk of lost frames. In one aspect the forwarding probability is biased in favor of network nodes that are determined to have sub-optimal communication quality with respect to the network node and unbiased for network nodes that are determined to have acceptable communication quality. Moreover, the forwarding probability may change dynamically in accordance with changes in the network topology. In embodiments the forwarding probability may be updated or modified without requiring any deterministic routing information analysis. Any delay in determining changes in the network topology may be reduced or eliminated because the network topology is determined at each synchronization interval.

Figure 6:
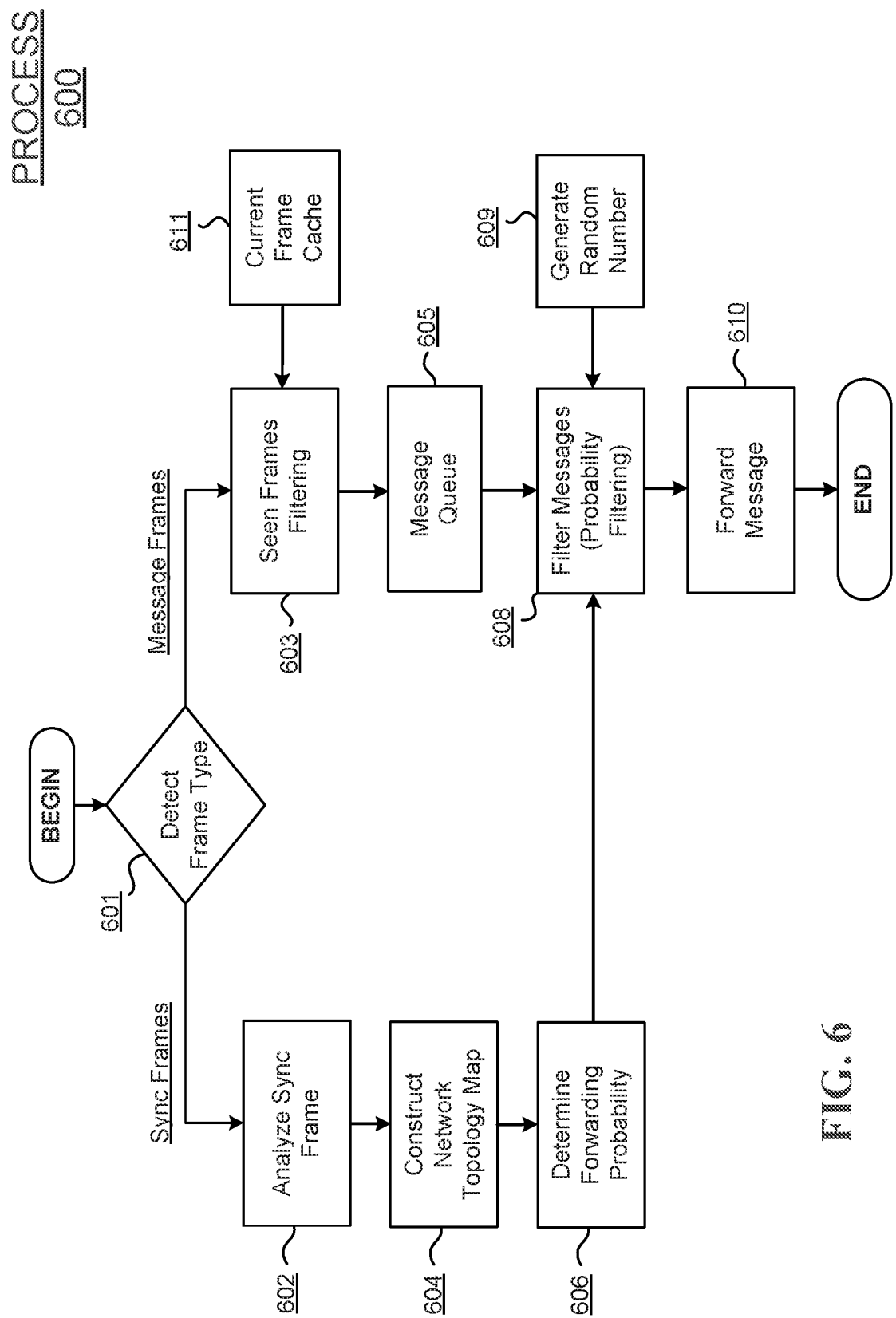
FIG. 6 depicts a flow chart of an example embodiment of a process for probability forwarding of messages in a mesh network in accordance with the techniques described in this disclosure.

FIG. 6 depicts a flow chart of an example embodiment of a process for probability forwarding of messages in a mesh network in accordance with the techniques described in this disclosure. In the illustrated embodiment, process 600 begins at operation 601 wherein incoming frames are received and the frame type is detected. Received message frames are categorized by the message receiver as either synchronization ("Sync") frames or message frames (i.e., network messages). If a message frame is detected at operation 601, it is moved through a seen frames filtering process (operation 603)—see "Duplicate Frames" section discussed below—and placed into a pending messages queue (operation 605). The messages queue 605 holds the message frames that a network node is waiting to forward. Messages may be randomly assigned a transmission slot time for transmission during a synchronization window.

But if a synchronization frame is detected, it is analyzed at operation 602 and used to construct a network topology map at operation 604. As previously described, each node may send one synchronization frame at a random time during the sync window. Synchronization frames may contain a Neighbor Table, which in at least certain embodiments is a dynamic record of any given node's neighbors at the time the synchronization frame is sent by that node. By this mechanism each node broadcasts its current 'node view' to any other node in range. When received by any other node, this table may be used, in conjunction with similar tables from other nodes to build a neighbor topology. By determining the neighbor topology, any given node can resolve a "neighbors in common" ("NIC") count for each of the node's neighbors.

Referring to FIG. 5E and related discussion above, it can be seen from the topology that any message not yet seen by A has two paths it could travel to get to A—either from B to A or from C to A. The same goes for a message not seen by B that can traverse the network via either A or C and to C via A or B. The Neighbor Tables for each node will be:

Node A: Node B, Node C
Node B: Node A, Node C, Node D
Node C: Node A, Node B

From simple set theory, and by examination, this gives us a set of neighbors in common as:

Node A & Node B: Node C=>1 Neighbor in common;
Node B & Node C: Node A=>1 Neighbor in common;
Node B & Node D: —=>0 Neighbors in Common.

This data supports and confirms that the network topology described above provides each node the ability to discern the 'local' topology of a node interacting with its immediate neighbors.

Now, generalizing, we can say that any message traveling to Node A can travel over either path Node B=>Node A or Node C=>Node A. Thus either Node B or Node C can choose not to forward such message without risk that Node A will never receive it, as long as they don't both decide to not forward the same message. In this aspect, Node B and Node C do not decide between themselves, they each decide independently. In order that Node B and Node C are unlikely to both decide to not forward any given message, a Forwarding Probability Index ("FPI") may be determined which is assigned to each message in the queue. In this example, the base probability calculation would be that it is desired for Node B or Node C to forward at least ½, or 1/(NIC+1), frames for Node A. By similar analysis, Node B can deduce that it needs to forward all frames from Node D as there are no other nodes in common between Node D and Node C or Node A.

Referring back to FIG. 6, the forwarding probability may then be determined based on the determined network topology map (operation 606). In one embodiment, if there are "N" number of network nodes within range of a particular network node, the probability forwarding for the particular network node may be given by the inverse of the number of nodes within range or 1/N. Other embodiments are possible, as well as biasing the probability forwarding up or down as discussed previously.

Probability Filtering

The messages may then be filtered at operation 608 based on the forwarding probability provided from operation 606. In the illustrated case, numbers from a random number generator are also provided at operation 609 and used in the message filtering. The probability filter may take the FPI and use a standard probability calculation to generate a forwarding probability for each frame such that (referring to FIG. 5E) Node A has a specific target probability of receiving a frame from either Node B or Node C. Then a random number from the random number generator may be used to statistically forward or dropped frames according to the generated forwarding probability. For example, for a required FPI of 75%, a random number selected from the set of integers 0-99 would forward each time the number is in the range 0-74 and drop the frame each time the number is in the range 75-99. Each node thus selectively forwards any given message received from another node based on a self-assessed forwarding probability being determined by analysis of the network topology map constructed by each node relative to each of its neighbors and derived from details provided by each synchronization frame received from its neighbors.

In generating the forwarding probability, it is anticipated to skew (or bias) the probability to account for incidental factors link network link quality, traffic volumes and historical success metrics. In general the size of the neighbor table in each node need not be large, or the resulting topology analysis complicated. In one implementation a neighbor table size of 8 has proven more than adequate for mesh networks of 100 or more network nodes. Messages can then be forwarded from the filtered messages in accordance with the determined probability forwarding and/or random number generation at operation 610. Probability forwarding allows the probability that any given node forwards any given message changes dynamically, adaptively, and in lockstep with any change in the immediate vicinity network topology without the need for 'network complete' routing information analysis. Also, since network topology is determined locally at each synchronization interval, there generally is little or no delay in determining the effect of a change in network topology. Any given forwarding probability may be biased as needed based on the statistical analysis of traffic in relation to any given node. For instance, the forwarding probability can be biased in favor of nodes that have sub-optimal communications quality (other nodes can 'shout louder' to that node). As a result, and in general, forwarding probability may be biased slightly above the strict topological probability to account for the natural indeterminacy in RF transmission and associated risk of lost frames. This process significantly reduces the number of redundant message transmissions in a redundant path flood fill network. In FIG. 6, the seen frames filtering operation may be configured to receive information relating to the current frame cache at operation 611. This completes process 600 according to one example embodiment.

Another way of doing this would be if not every node needs to turn off. In at least certain embodiments, network nodes have the option to remain on at all times. Some nodes could be left powered-up and listening the entire time. This would typically be used where the node has access to a continuous power source. In all other respects, powered nodes are the same as non-powered nodes. Non-powered nodes can wake up and broadcast a synchronization frame and the powered node(s), once a network message is received, can broadcast a network message providing the mesh details, including synchronization interval. This enables improvement in query response for those nodes such that any newly joining node can communicate a query frame at any time and then listen for a broadcast frame containing the current mesh synchronization details. This can reduce the power requirements for joining a mesh. This can also allow for the use of unsynchronized (or pop-up) nodes that simply turn on, broadcast some messages, and then go back to sleep. Such messages can be picked up by any always-on node in the network and delivered via the normal mesh process.

Network Addressing

The techniques described herein do not require statically assigned addresses. But "ephemeral" addresses, or node identifiers, may be used for the network nodes. Ephemeral addresses are defined by each node, each time it is added to the network (via separate address resolution protocol). Applications can use any unique name to identify a given node via the device naming protocol. Such techniques include a process whereby each node may randomly assign itself an N-bit ephemeral address and broadcast an address resolution message to correspondent nodes. If the address is resolved within the mesh, then the address is already taken, and the node randomly assigns itself a new address. This cycle continues until the joining node has a unique address. This ephemeral address technique is only good for the particular mesh and may not persist across multiple mesh networks. The ability to create and utilize an ephemeral address is an important simplification that significantly eases the burden of node configuration and address management. One feature includes the ability to track specific nodes using ephemeral addresses.

Heat Mapping Feature

Each node may also choose to maintain a heat map of neighboring nodes and source nodes. The heat map provides the probability that any given neighbor will lead to a pathway to a given intended message recipient. The heat map may be built by tracking which neighbor nodes were responsible for delivering messages sourced by the recipient. The network nodes can then use this mapping to determine (i) if a message frame destined for a particular recipient has already been received by a neighbor (via the message receipt table 208) and (ii) the corresponding probability that the message will be dropped when this neighbor has already seen it. By using probabilities that can increase or decrease with changing conditions, the mesh network can dynamically bias its rebroadcast probability in favor of certain nodes in the face of dynamic topologies, as well as stale heatmap information.

While this alone can improve channel efficiency by reducing traveled paths, it is relatively resource hungry and does not scale well, requiring a node table the size of the network in addition to a simple table of immediate neighbors. However, these drawbacks may be mitigated by maintaining a cache of 'hot nodes', which may be advantageous over storing large routing tables in deterministic networks. The network node itself maintains a listing of hot nodes or a "hot list" and determines whether or not it is going to favor a particular node based on the hot list. And this can evolve over time as the network adapts to changing network traffic. In the event that the pathway to a hot node becomes compromised or stale over time, other neighbor nodes can become preferred as messages sourced by a previously identified hot node begin to arrive preferentially from other nodes instead. The broadcast nature of message communications in the mesh network and the use of dynamic discard probabilities can be adapted to ensure that other nodes have opportunity to pass along message frames destined for a hot node in the case where a specific network node can no longer be reached by the preferred path.

As previously described, it is possible to improve the flood fill technique for dynamic topologies by allowing any given node to choose not to forward certain messages using probability forwarding. It is possible to further optimize flood fill networking using the notion of a 'Heat Map' as a collection of 'Hot Nodes' that indicate the fastest or best path from any given node to a specific destination node. The process of managing Hot Nodes and maintaining a Heat Map is collectively known as 'Heat Mapping'. A Hot Node is defined herein as a network node from which a message frame from any other node was most recently received (i.e., the hot node acted as the conduit for the message originating from a different node), where the notion of 'most recently received' is specifically further defined as an aggregate estimation of the probability that a message sent specifically to that Hot Node would be the first message frame of many duplicates of the message frame to reach the destination. Hot Nodes can therefore be both node-specific and node-relative, and there can be an implicit assumption that the send path (from the receiving node to the originating node) has the same associated network costs as the receive path (from the originating node to the receiving node).

A Hot Node list (or table) can be used to bias the probability forwarding of specific destination messages from any given node in favor of the Hot Node to the possible exclusion of other neighbor nodes. It can be shown that, though forwarding may be biased fully toward one or more nodes, a mesh network using Heat Mapping is still robust to changes in dynamic topology, as all neighbor nodes can be continually listening and making their own forwarding determinations.

In at least a preferred embodiment, a Hot Node is a node-relative estimation of the best path for a message frame from the estimating node to another specific node. Accordingly, Heat Mapping requires the use of some form of node addressing. Since the maintenance of a Hot Node table depends on additional node resources (process time, storage and memory) and some form of node addressing (message overhead), its use is optional for the techniques heretofore described and/or can be used in addition or combination with the previously described techniques.

Node Address Allocation for Heat Mapping Feature

As has been previously described, flood fill networks do not require addressing for the delivery of messages. However there are, in certain cases, good reasons to know from which node a message has originated and to which node the message is destined. The use of Heat Map optimization is one such use that depends on node addressing, and is thus only available in mesh network embodiments that use some form of node addressing mechanism. Addressing schemes are well described in literature and when required, the preferred embodiment may utilize the specific scheme described herein. As described above, it is possible to assign addresses when a node first joins the network. A network address may be any suitable size, and may be determined at run-time.

When using addressing and joining a network, each node may derive an address from a random number generator and may send out an Address Resolution Query ("ARQ") frame to determine if the address is already in use. If, after sending an ARQ frame and prior to joining the network, the node receives an Address Resolution Response ("ARP") frame, the node can regenerate a new address and repeat. In the preferred embodiment, a node may send multiple ARQ frames spaced at suitable intervals to ensure no address collisions exist in the network. If a node does not receive an ARP frame within a specific (configurable) time interval (the 'join interval'), the node may assume the address is free and begin using it. If during the course of network operation, a network address collision is later detected, each node with the duplicated address can incrementally increase its joining time interval and restart the address allocation protocol. It should be clear from this that the network join time thus becomes a rough approximation for the complete out and back (fill and refill) network traversal time. Other, more robust schemes are possible, but any specific embodiment does not affect that addresses can be dynamically allocated to a particular node when joining the network and the address size can be optimized, e.g., at runtime or as preferred, for minimum transmit power and storage costs. For instance, a network of 256 nodes or less can use an 8-bit addressing scheme. For larger networks the address size can scale to match the size of the network being deployed. The network address size and the join interval may also be shared among network nodes in synchronization frames such that new nodes can join the network without prior knowledge of these network configuration details.

Hot Node Derivation

In addition to an address, each node should be configured to know which neighbor forwarded any given message. This adds to the message overhead each time a message is forwarded by a node. When a message frame arrives the originating and forwarding node pair may be assigned a Heat Index Value that communicates the order in which the message frame was received. Thus, the first message frame from node A, received by node C, via node B can be allocated a value indicating that the message path B was fastest local route from A to C. The next (duplicate) message frame received via a different path indicates the next fastest forwarding path node and is assigned a corresponding Heat Index Value, and so on. In this manner, an ordered Hot Node list can be generated for each originating node. Heat Index Values thus derived may be aggregated over time and the average of those values may be used to define an ordering of Hot Nodes (or 'Hot Node Order') for a given originating node. The Hot Node appearing at the top of this list can be designated as the Hot Node for sending message frames back to that particular originating node. This ordering can then be used to further bias the probability forwarding in favor of the Hot Node, thus optimizing message flow through the network and reducing redundant message re-transmission.

Figure 7A:
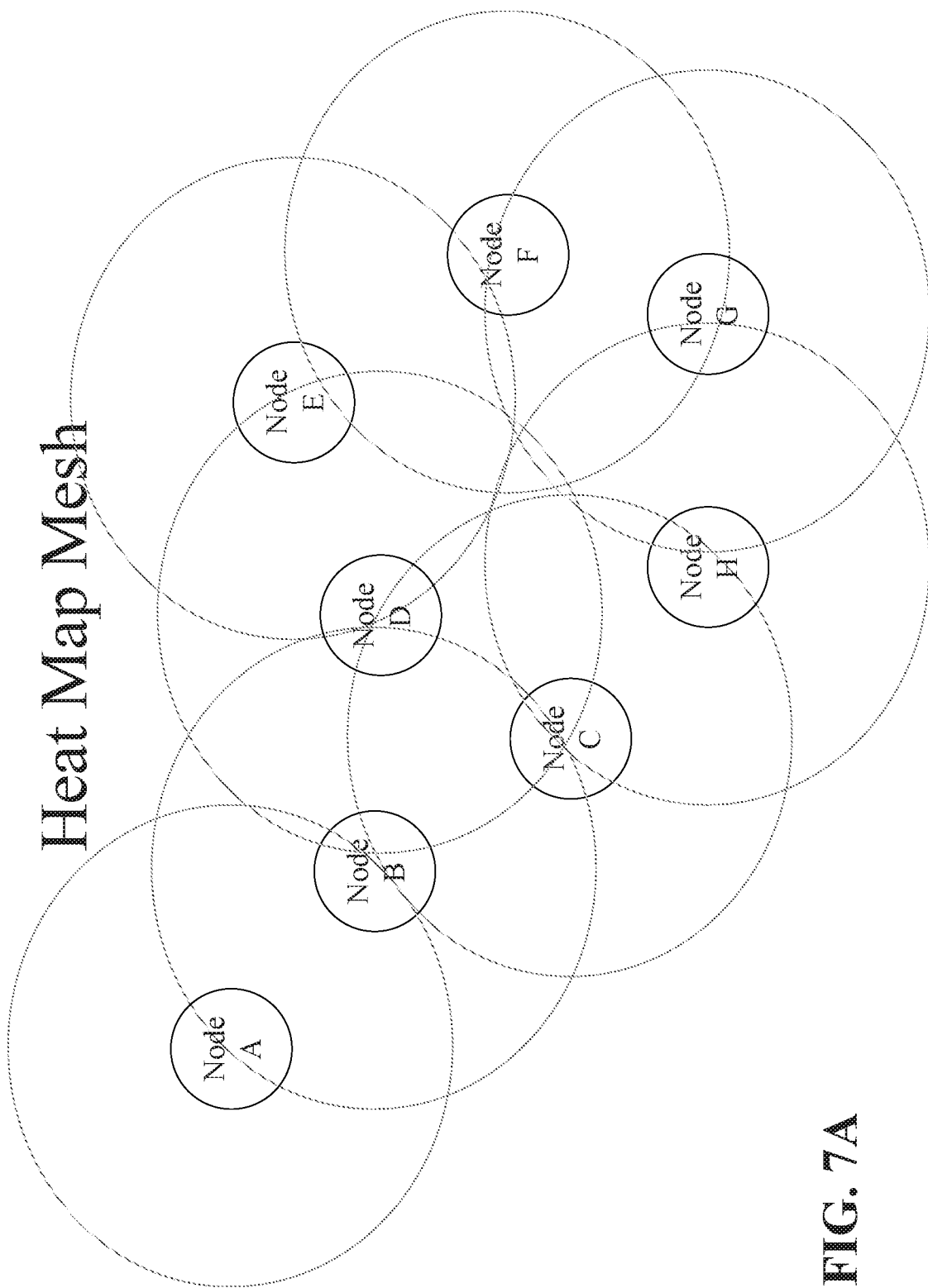
FIGS. 7A-7C depict an example embodiment of messages passing through network nodes in a heat map mesh in accordance with the techniques described in this disclosure.
Figure 7B:
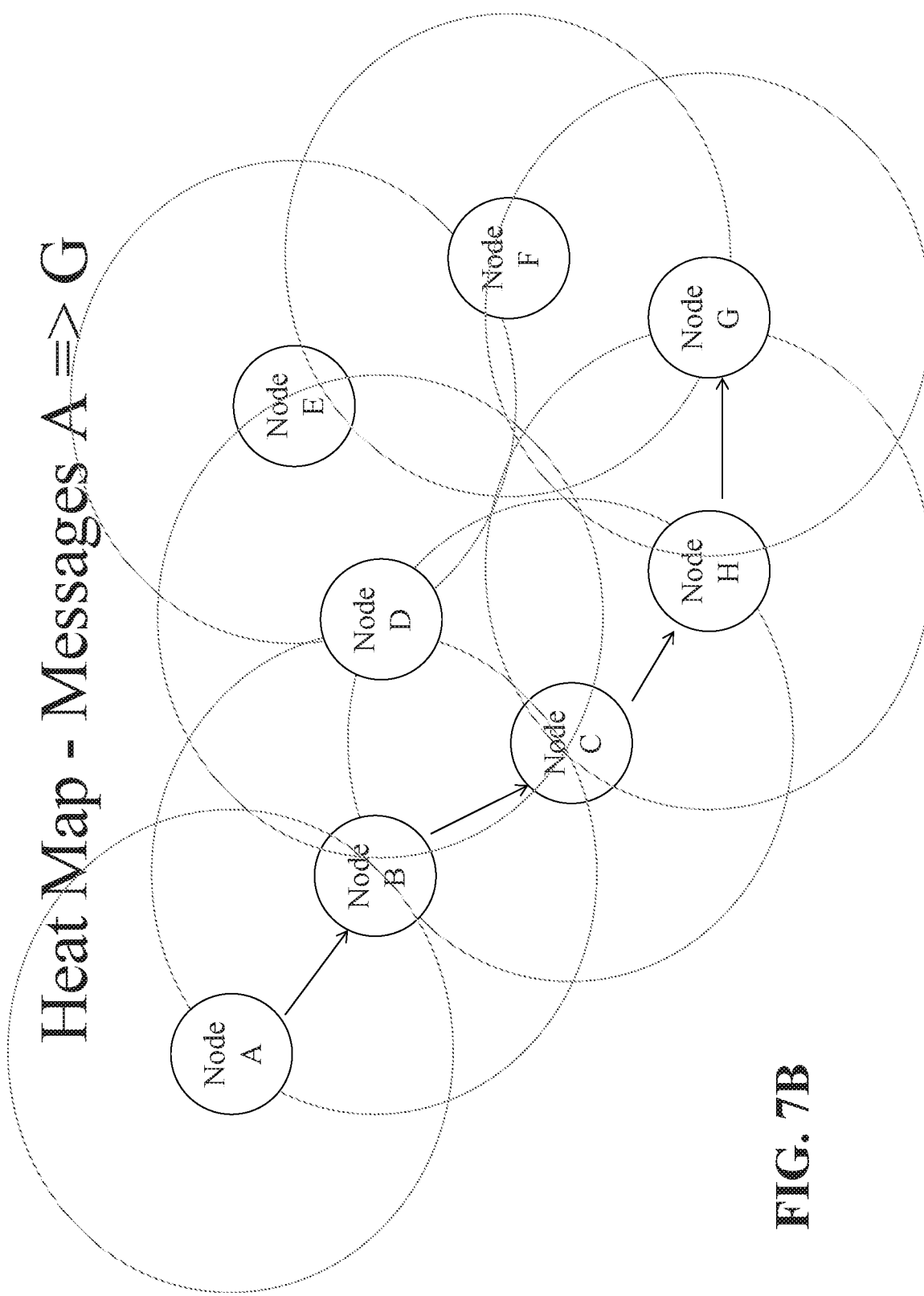
Figure 7C:
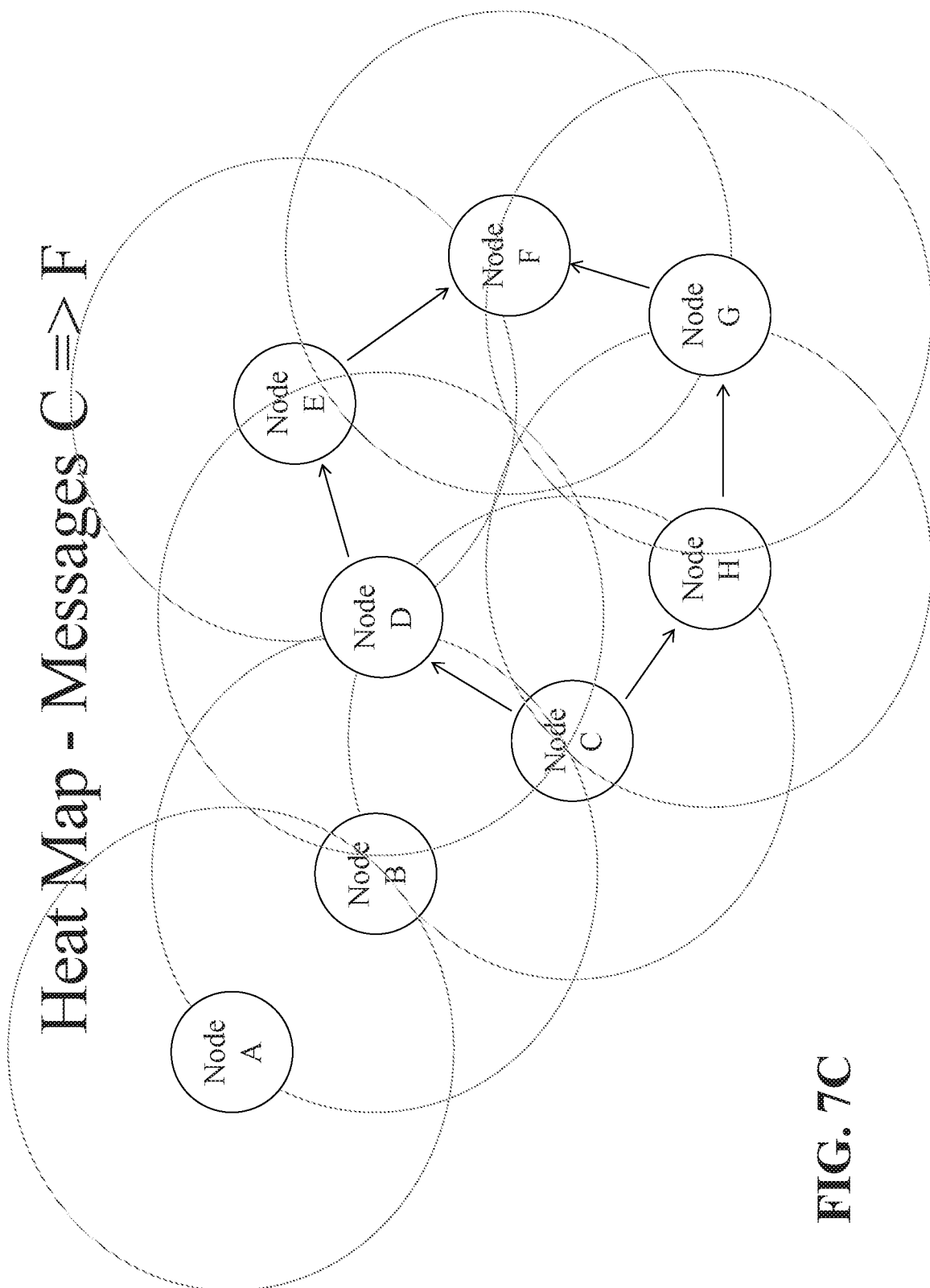

For any given node (determining node), a Hot Node may be defined as the neighbor node for which a message frame destined for some destination node, on being delivered to that neighbor node, will traverse the shortest path to the destination node from the determining node. For such determining node, the Hot Node for a particular destination can be determined by tracking the arrival times of duplicate frames sourced from the destination node against the specific neighbor node from which the message frame was received relative to duplicates of the message frame received from the other neighbor nodes. By way of example, referring to FIGS. 7A-7C, a number of message paths are shown graphically for which the Hot Node tables can be derived for each node. FIG. 7A depicts an example embodiment of a heat map mesh network. As shown in FIG. 7B, Hot Node C (relative to determining node H) resides in the path most traveled ('Hot Node Path') from node A to node G. Other paths are similarly deduced. In FIG. 7B, the Hot Node for messages sent or being forwarded from node G to nodes A, B or C will be node H, where node H is determined by node G as the deliverer of the first arrivals of message frames sourced by nodes A, B or C. In FIG. 7C, the path from node C to node F can go through either nodes D and E or H and G. Those nodes therefore have an equal Heat Index Value for messages communicated from node C to F. The Hot Node for messages destined for Node C being sent or forwarded from Node F could be either Node E or Node G, each having roughly the same backward propagation times from node F to node C (all other factors being equal). The exact balance between node E and node G would be determined by the relative arrival times of a message frame and its duplicates from node C to node F, which can arrive via the two paths including both node E and node G. The nodes in both paths are considered to have less 'network heat', and so the forwarding probability may be biased to either or both sets of nodes. Since in this circumstance the Heat Index Value may be the same for both paths, node C can choose to forward messages through either node D or node H with the same outcome (again, all other factors being equal). The forwarding probability can also be used to load balance across multiple paths.

As has been previously described, each node can keep track of the of the message frames seen from various originating nodes. To conserve space, this can be maintained as a least recently used ("LRU") cache. In an LRU cache, the most active nodes are the most likely to appear in the cache and ordered by activity. Furthermore, using a shared 'seen table', it is possible to further optimize Heat Mapping. The first N message frame entries in this LRU cache may be included in each node's synchronization frame such that any neighbor node may determine which messages the forwarding node has seen. The number N is a tuning parameter and may be configured as a compromise between the cost of processing and transmitting the additional information and the value of Heat Mapping to the overall network throughput.

Upon receiving a synchronization frame including a network node's 'Seen Message Cache', the receiving node can determine if a given node has already seen a message in its message queue. If all neighbors report seeing a given message in the node's message queue, that node may determine that the message may immediately be dropped from the forwarding message queue as discussed previously. Further, if the receiving node's Hot Node for a given message destination has seen that message, then that message may also be given a higher probability of being dropped. Typically, all such messages are dropped (0% Forwarding Probability). However, maintaining some low Forwarding Probability assists in path loss recovery (as described below) which is a network tuning parameter.

In this manner, over time an optimized path may be navigated simply by each node tracking information about the network node that first delivered a message frame from a given source node via any of its neighbors. From this description it should be clear that each node, individually, can create a preferred forwarding path for any destination by tracking that destination node as an originating node for a message frame. Though the neighbor nodes never get to see it, the aggregate view of each node's Hot Node table provides the details regarding the fastest paths through the network from each originating node to each other node. This is, collectively, referred to herein as the network 'Heat Map'.

In other embodiments, the Hot Node designation may be added to the message frame when forwarding as an instruction to the Hot Node to always forward frames, and for other neighbor nodes to use reduced forwarding probability. In other embodiments, the corresponding neighbors may use their own knowledge of both the state of the nominated Hot Node and their own Hot Node for that destination to determine their own forwarding probability.

Path Redundancy

Finally, it is important to highlight the dynamic nature of the Hot Node tables. By averaging the Heat Index Values over time, the Hot Node may be spread across a collection of neighbors, thus providing an optimized, but still redundant path. Further, although each node may bias 100% Probability Forwarding toward the Hot Node for a given destination, because the mesh uses broadcast messages and every neighbor will receive and probably forward each such message in the mesh network, path redundancy is thus still implicit to the technique. If a path is lost, for instance, a Hot Node is removed, any given message can still be forwarded and seen by all neighbors. In addition, the destination Hot Node table may be aged and eliminated entirely if no messages are received from the destination.

Thus Heat Mapping provides a means of reducing redundant transmissions in a flood fill network without loss of path redundancy. However, it should be clear from this description that Heat Mapping is only useful if the rate at which a node is physically moving (the rate of topological change) is less than the rate at which the node is generating messages. This will vary in time and deployment and thus Heat mapping is an optimization, not a requirement.

Figure 8:
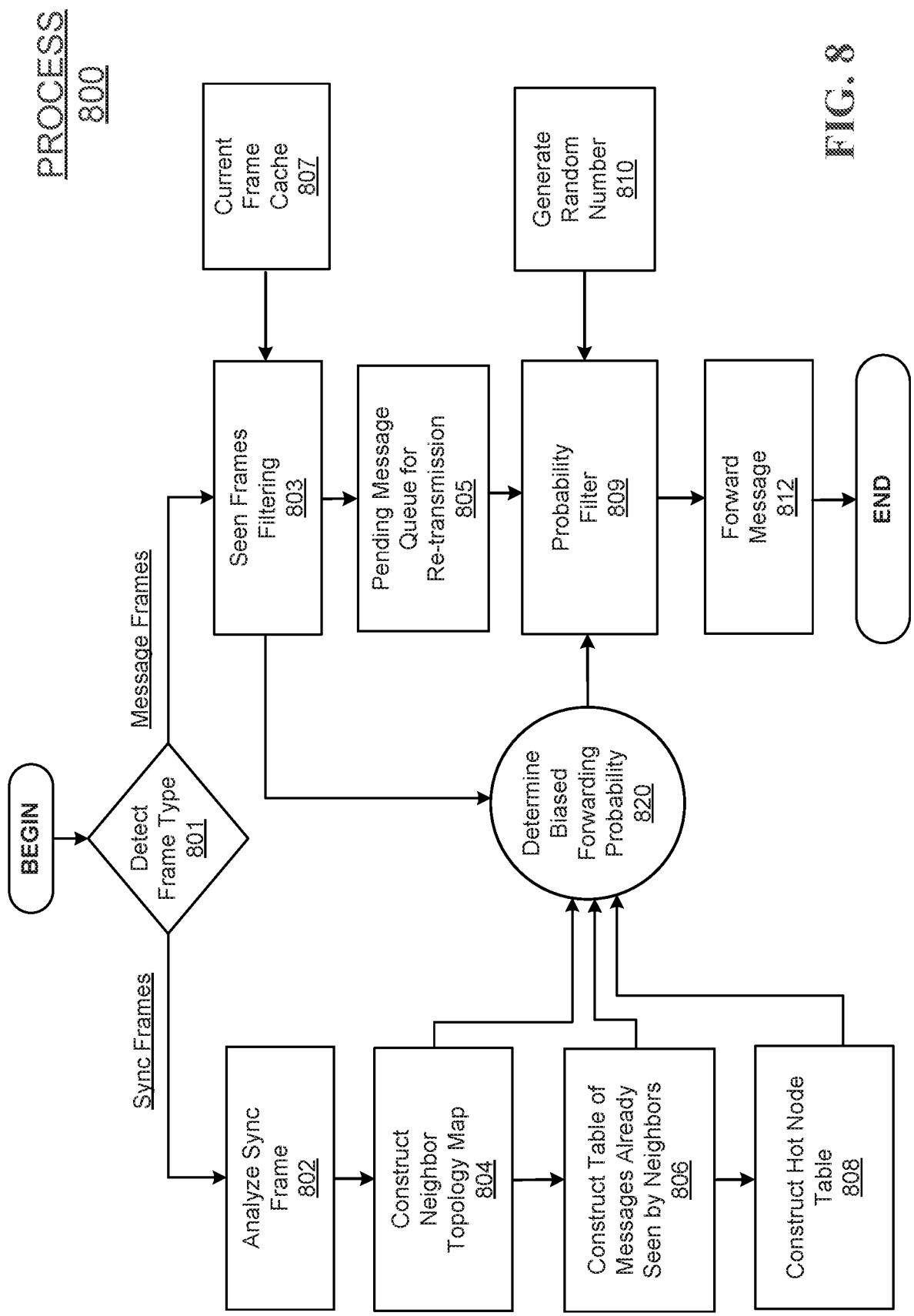
FIG. 8 depicts a flow chart illustrating an example embodiment of a process for probability forwarding of messages in a mesh network used in combination with a heat mapping feature in accordance with the techniques described in this disclosure.

FIG. 8 depicts a flow chart illustrating an example embodiment of a process for probability forwarding of messages in a mesh network used in combination with a heat mapping feature in accordance with the techniques described in this disclosure. In the illustrated embodiment, process 800 begins at operation 801 wherein incoming frames are received and frame type is detected. Received frames are categorized by the message receiver as either synchronization frames or message frames. If a message frame is detected at operation 801 it can be processed at operation 803 to determine if the message frame has been previously seen. A current frame cache may be accessed to make such determination at operation 807. If the message frame has been previously seen by the network node it can be identified as a duplicate message frame and discarded (see "Duplicate Frames" section above). If the message frame has not been previously seen by the network node, it can be placed into a pending messages queue for re-transmission out onto the wireless radio network (operation 805). The pending messages queue can be configured to store the message frames that a network node is waiting to forward. Message frames may be randomly assigned a transmission slot time for re-transmission during a synchronization window.

On the other hand, if a synchronization frame is detected at operation 801 it can be analyzed at operation 802 and used to construct a neighbor topology map at operation 804. The neighbor topology map may include information about which nodes are within range of a particular network node for wireless communications and the signal strength associated with each neighbor node relative to the network node. As previously described, each network node may send one synchronization frame at a random time during the synchronization window. Synchronization frames may contain a neighbor table which, in at least certain embodiments, may comprise a dynamic record of any given node's neighbors at the time the synchronization frame was sent. That is, using the synchronization frames, each node may broadcast its current 'node view' to any other node within range. When received by any other neighbor node, the neighbor may use the neighbor table, in conjunction with similar tables received from other nodes corresponding on the wireless radio network, to construct the neighbor topology map (operation 804). Also any given network node can resolve a 'neighbors in common' (NIC) count for each of the node's neighbors based on the neighbor topology map. In addition, a table of messages already seen by the network node's neighbors may be constructed based on information derived from the synchronization frames (operation 806).

As discussed previously, when message frames arrive, the associated originating/forwarding node pairs may be given Heat Index Values indicating the order in which the message frames were received relative to duplicates of the message frames received from other originating/forwarding node pairs along different paths in the mesh network. At operation 808, the network node can use this information to construct a Hot Node table based on the aggregate ordered listing of Heat Index Values for the originating/forwarding node pairs in the network. As discussed previously, the Heat Index Values may be aggregated over time and the average of those values may be used to define an ordering of Hot Nodes for a given originating node. The originating/forwarding node pair appearing at the top of this list can be used to identify Hot Nodes for communicating messages back to the originating node.

At operation 820, a biased forwarding probability may then be determined based on a combination of inputs from the neighbor topology map (operation 804), the table of messages already seen by neighbors (operation 806), and the hot node table (operation 808). The message frames may then be filtered at operation 809 based on the results of operation 820. In the illustrated embodiment, numbers from a random number generator may also supplied and used in the message filtering (operation 810). The probability filter may use a standard probability calculation to generate a forwarding probability for each frame and a random number provided from the random number generator may be used to statistically forward or drop frames according to the generated forwarding probability. Message frames can then be forwarded from the filtered messages in accordance with the determined probability forwarding and/or random number generation (operation 812).

In generating the forwarding probability, it is anticipated to skew (or bias) the probability to account for incidental factors link network link quality, traffic volumes, and historical success metrics. Any given forwarding probability may be biased as needed based on the statistical analysis of network traffic in relation to any given node. For instance, the forwarding probability can be biased in favor of nodes that have sub-optimal communications quality (other nodes can 'shout louder' to that node). As a result, and in general, probability forwarding may be biased slightly above the strict topological probability to account for the natural indeterminacy in RF transmissions and associated risk of lost frames. This process can significantly reduce the number of redundant message transmissions in a redundant path flood fill network. This completes process 800 according to one example embodiment.

Handling Duplicate Message Frames Using Message Age Disambiguation

The 'seen frames' filtering (e.g., operation 603 of FIG. 6 and operation 803 of FIG. 8) may be used to detect (and optionally discard) message frames that have already been seen by a node. Each node may include a mechanism for detecting incoming messages it has seen previously to prevent unnecessary propagation of repeated message frames in the network. One way of preventing unnecessary propagation of repeated message frames is by generating a unique identifier for each message frame that a particular network node broadcasts onto the network. Each node can be adapted to calculate (and store e.g., in local memory) the unique identifier for each message frame it broadcasts onto the network. In one embodiment, the message identifier may comprise a hash value, such as a Pearson Hash value. The hash value of a Pearson Hash is well known in the art and has the property of being very sensitive to small changes in message content. In at least certain cases, the source (producer) node's network address, the counter value associated with a message frame, and a corresponding hash value (e.g., calculated by performing a Pearson Hash function on the combination of the contents of the message frame and its counter value) may be sufficient to determine whether a received message has been previously seen. A flood fill network can use a counter and a hash value to determine if a received message frame has been previously encountered. The hash value and the sequence number can be used to both ensure uniqueness of message frames and to indicate the age of one message frame relative to another as discussed below.

Many communications or distributed systems have the problem of determining the age of one message frame in relation to another. This may be generally solved by associating a unique sequence value with each message frame to indicate the sequence of messages sent by a given source node. Message frames, received from any given node, that are the same age or older than the most recently received message frame sent from that same node may, at least in some cases, be dropped as redundant. This process is referred to herein generally as message age disambiguation.

In many cases, message frames may be broadcast by a source node onto the network that only differ from their corresponding previous message frames by the unique sequence value associated with each message frame. In one embodiment, message age disambiguation can be accomplished using a technique that makes message age determinations based on comparing a sequence number associated with each message frame.

A particular and important characteristic of many distributed systems is that the time a message may be considered as 'in process' (i.e., circulating within the network) is finite and measurable. For example, a message generated by a first system to update an airline reservation will take a finite and measurable amount of time to be sent to and analyzed by any receiving system required to maintain the reservation system in an updated state. If a second reservation message is generated by the first system but it arrives at the receiving system before the first reservation message, the receiving system must be able to process the reservation requests in the correct order so that a consistent shared state of the reservation system can be maintained. Once the global state is updated, any further copies of the message received at the receiver is redundant and may be discarded.

It should be noted that it is only the spread of sequence numbers that are in circulation in a particular system at any given moment—and not the absolute maximum value the counter values can count up to—that determines the number of bits required to handle message disambiguation based on age. In at least certain embodiments the size of the digital counter (and hence the value it counts up to) can be made just large enough such that no two message frames broadcast from the same network node can remain in circulation in the network for a time interval longer than it takes for the counter to wrap back to zero. This can be determined based on the source network node's message generation rate.

As mentioned, in traditional approaches, each network node can be equipped with a counter to provide the sequence numbers. Each broadcast message frame can be provided with a counter value, and the counter values of each message frame can be compared to determine their relative age with respect to one another. The counter values can be incremented at the network node and associated with the message frames when new message frames are broadcast out onto the network. Thus, even if message content remains the same over an extended period, for example a sensor value remaining constant, the counter values associated with each message frame will be continuously changing, thus causing a corresponding change in the hash value for each message frame.

Consider an infinite, monotonically increasing, natural sequence number $\{0, 1, 2, \ldots \infty\}$. Such a sequence number begins at zero and runs to infinity. Each message frame can be placed in order in relation to other message frames because each value in the sequence will be unique with respect to all other sequence values. And if the further constraint is added that no message frame may sample the same value, then a simple arithmetic comparison between the absolute values of the counter values for each message can be used to uniquely determine the age of one message in relation to another. For example, it can be deduced that a message frame with sequence count value of 2 is older than a message frame with a sequence count value of 4. In general, and given the constraints, it can be said that the age of a message A may be determined as older than message B if seq(A)<seq(B) and newer than message B if seq(A)>seq(B).

However, in some cases, the originating node's network address, message counter value, and corresponding hash value are not, by themselves, sufficient to determine if an incoming message frame is older or newer than a previously received copy of that message frame. This is because the sequence numbers associated with messages (both newly received messages and copies of the newly received messages already stored in the node's queue of received messages) cannot be compared via a direct integer compare operation because the counter value may wrap too quickly. This wrapping can cause problems in distinguishing older messages from newer ones of the same type as the sequence value approaches the counter value range boundary.

In the real world digital counters must wrap to zero once they reach their maximum count value, and thus an infinite sequence of natural sequence numbers is not amenable to practical implementation. Real world digital counters rotate through a maximum value, represented by the number of counter bits, and then back to zero from which the counter will begin counting again. An 8 bit counter for example begins at zero (binary 00000000) and counts up to 255 (binary 11111111) before the next addition loses the high order bit and the value wraps back to zero. In such cases, the comparison between a message A with a sequence value of zero in relation to a copy of message A with a sequence value of 255 is ambiguous as to which message was first generated. Message A could actually be the first (zeroth) message and thus older than its copy or it could be the 256th message (which wraps to zero) and is thus newer. Traditional methods for dealing with this problem use larger and larger sequence numbers, wasteful of both power and processing.

In summary, a sequence number distinguishes distinct, successive message frames from the same node. In some cases, it cannot be used to disambiguate copies (duplicates) of the same message. Distinct message frames from the same node may contain the same message content as in a node reporting the same constant temperature every minute for example. Without the sequence number, the hash value would not change, and each new message appear the same as a duplicate frame. A hash that includes a sequence number can immediately determine duplicate frames and, in comparing frames where the hash is different, the sequence number can be designed to disambiguate age. In cases, when the hash is the same, the duplicate frame can be discarded. In all other cases, and subject to the constraints of digital wrapping, the sequence number can be used to inform as to whether one frame is older than another such that the older frame can also be discarded. The teachings of this disclosure eliminate the constraints of digital wrapping while also minimizing the number of bits required to implement an effective sequence counter. By this technique both distinct successive node message frames and their (network generated) duplicates are disambiguated.

Figure 9A:
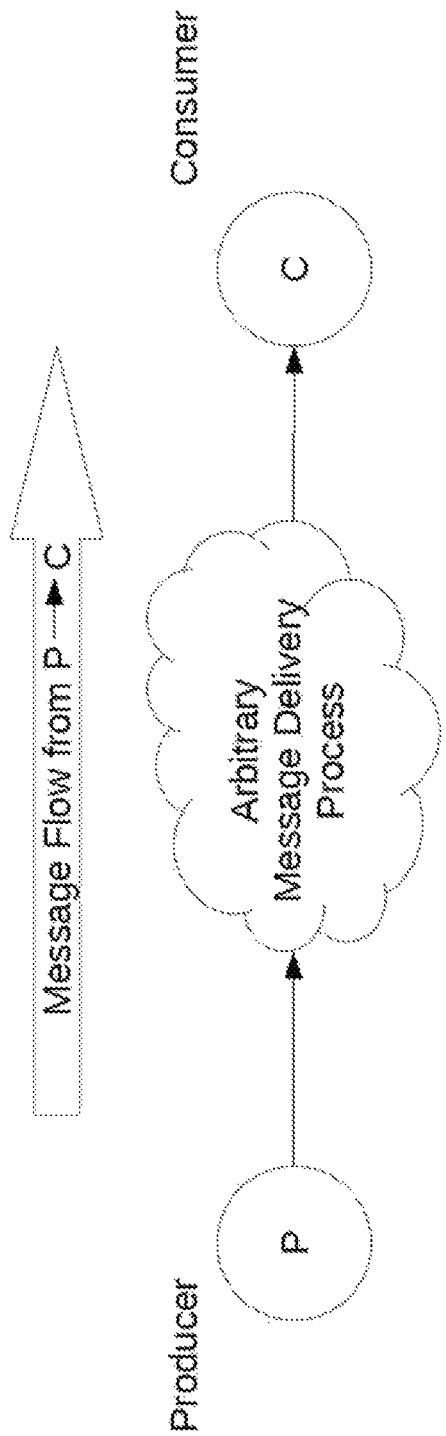
FIG. 9A depicts an example embodiment of a flow of sequenced message frames from a producer network node to a consumer network node in a network in accordance with the teachings of this disclosure.

FIG. 9A depicts an example embodiment illustrating a flow of sequenced message frames from a producer network node to a consumer network node in accordance with the teachings of this disclosure. In the illustrated embodiment, a message producer node P generates message frames that are sent to a message consumer node C through a message delivery process (e.g., network) such that the message frames may be arbitrarily delivered to consumer node C out of order (or lost entirely before reaching consumer node C). The producer node P generates a potentially infinite number of messages that may be assigned a natural sequence number $N \in \{0, 1, 2, \ldots, \infty\}$. When sending any such message, the natural sequence number N can be mapped onto the b-bit sequence number space $n \in \{0, 1, 2, \ldots, 2^b\}$ produced by a b-bit counter as $N \bmod 2^b$. Note, purposes of this example, the assertion that the message with number zero is special (described below) is ignored. The special use of zero can be useful in conveying or indicating in-band state information, it makes no difference to the message age discrimination scheme set forth herein. When used, messages with the sequence number value zero can be configured to map to the natural sequence number zero, which is always the oldest message from the producer node.

Alternatively, in another embodiment the counter values can be divided into fields such that the value of zero is special and only occurs on the very first usage of the counter. The special value zero can then be used to disambiguate certain node state conditions such as, for example, upon initialization or power-up of the network node. In these circumstances the counter can be incremented such that it wraps to sequence number 1—not zero—to maintain the integrity of the use of zero as a special value in addition to a sequence value. In this case, when the counter wraps, for example from 255 to 1, a simple compare again does not indicate that a newer message with a counter value of 1 is newer than a queued message with a counter value of 254 (for example).

Many counting systems faced with such a problem can be configured to maintain an overflow bit to disambiguate the message frames in such circumstances, with the high bit being returned to zero after such time as it may be reasonably expected that all messages with the high bit set have been received by the destination network nodes. This may be referred to as an 'out of band' counting technique. But this technique adds an additional effective bit that requires special handling by both the sender and the receiver. Further, with the additional bit, effective resolution may be sub-optimal because such a number system can only utilize half the domain spanned by the effective number of bits. As an example, given the 8-bit range from 0 to 255, adding an additional 9th bit gives an effective range of 0 to 511 but that full range of 512 numbers cannot be fully utilized. In particular, the design of a system using such an out-of-band technique would need to design for the worst case and allow only a modest fraction of the extended numbers 256 to 511 to be utilized. This wastes the energy associated with transmitting the additional bit, and in particular, the additional energy associated with handling the additional bit 'out of band' from the actual sequence counter.

It is however possible to alleviate much of this wasted energy by using the sequence counter itself to manage counter wrapping, and thus to enable more control over, and utility from, the use of the shared sequence bits. This may be referred to as an 'in band' counting technique. Out-of-band techniques require the use of a separate overflow bit, and thus need separate handling from the sequence counter, whereas the in-band technique used in at least certain embodiments still uses an overflow bit, but because it is embedded in the sequence counter itself in a special way, it does not require any special handling which saves process energy. One example of an in-band counting technique is the special use of zero described above.

Figure 9B:
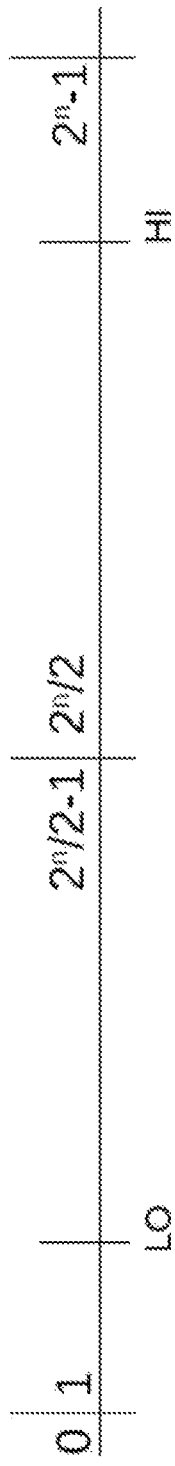
FIG. 9B depicts example embodiments of sequence numbers in a number space provided by a digital counter in accordance with the techniques described in this disclosure.
Figure 9B:
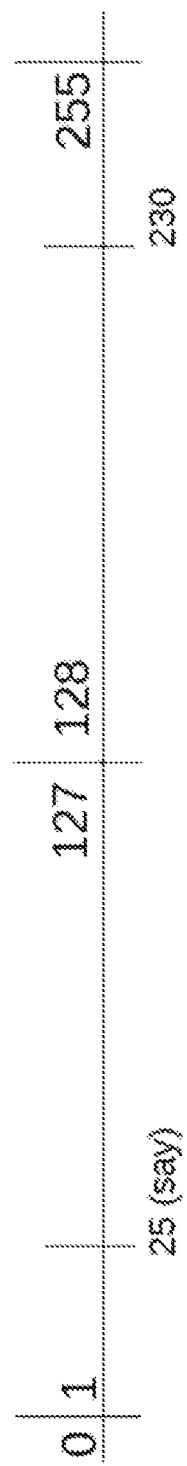

FIG. 9B depicts example embodiments of counter sequence numbers in a b-bit and 8-bit counter configured in accordance with the techniques described in this disclosure. In FIG. 9B(i) a number domain $2^b$ is first divided in two regions (i) from zero to $(2^b/2)-1$ and (ii) from $2^b/2$ to $2^b-1$. FIG. 9B(ii) shows this applied to the 8-bit example (corresponding to 256 distinct counter values from 0 to 255). In the latter case, the counter values in region (i) are from 0 to 127 and those in region (ii) are from 128 to 255.

In one embodiment, each subsequent message with a corresponding counter value can be analyzed for its relative age by further dividing the available number domain. Consider the b-bit number domain $N \in \{0, 1, \ldots, 2^b-1\}$ as shown in FIG. 9A(i), and as shown in FIG. 9A(ii) for b=8. A pair of counter values LO and HI can be defined such that:

1. LO & HI∈N,
2. $LO \in \{2, \ldots 2^{b-1}-1\}$,
3. $HI=2^b-LO$, and
4. the counter value LO is used to delimit the maximum number of message frames from a source (producer) node that can be in transit somewhere in the network at any given time.

Each network node only has to remember information long enough for message frames to propagate through the network. The number domain may be further divided into a LO region (n<LO) and a HI region (n>HI). In the 8-bit example, LO is shown as having been set to a counter value of 25 with corresponding HI value set to counter value 230 (255−25). Dividing a b-bit number into sub-domains allows the counter to wrap, while still allowing for the distinguishing of older messages from newer ones based on performing a simple integer comparison. Each newly received message frame can be compared with previous message frames stored in the network node's queue of pending messages to determine which messages are newer and which are older. In one embodiment, this can be based on associating (or assigning) a counter value to each message upon broadcasting it, and then increment the counter value within the range from 1 to $2^b$.

An algorithm for this technique is shown graphically in FIG. 9C which depicts an example embodiment of a process for disambiguating message frames received at a network node in a network based on message age in accordance with the teachings of this disclosure. In particular, FIG. 9C depicts a process flow for determining the age of one message A in relation to another message B, wherein message A is newly received by the network node and message B is one of the messages stored in the network node's pending messages queue that message A is being compared with. Message B may also be referred to herein as the "queued message". In the illustrated embodiment, process 900 begins at decision block 902 where it is determined whether the counter value associated with newly received message A is less than LO and the counter value associated with a queued message B is greater than HI. If this condition is satisfied, message A is determined to be newer than message B because it can be concluded that the message counter has wrapped, and message A has the most recent counter value (operation 904).

If the condition at operation 902 is not satisfied, then process 900 continues to decision block 906. In the illustrated embodiment, at decision block 906 it is determined whether the counter value associated with the queued message B is less than LO and the counter value associated with the newly received message A is greater than HI. If this condition is satisfied, message B is determined to be newer than message A because it can be concluded that the message counter has wrapped, and message B had the most recent counter value.

If the condition at decision block 906 is not satisfied, process 900 continues to decision block 910. In the illustrated embodiment, at decision block 910 it is determined whether the counter value associated with the newly received message A is greater than the counter value associated with the queued message B. If so, message A is determined to be newer than message B because it can be concluded that the message counter has not wrapped since LO is the maximum number of message frames in transmit at any given time, and message A has the most recent (in this case largest) counter value. But if this condition is not satisfied, message B is determined to be newer than message A because it can be concluded that the message counter has not wrapped, and message B has the most recent (in this case largest) counter value. This completes process 900 according to one example embodiment.

Thus, for example, for two messages A1 and B1 where N is equal to natural sequence numbers 7 and 250, those messages A1 and B1 map to the 8-bit counter values 7 and 250, respectively. But for two messages A2 and B2 where N is equal to the natural sequence numbers 1907450 and 1907563, those messages A2 and B2 map to the 8-bit counter values 250 and 7, respectively. The consumer node C only has the counter values to determine the relative message age of A1 and B1 and A2 and B2. In the first example, message A1's counter value of 7 is clearly older than message B1's counter values of 250, but in the second example, as can be seen, message A2's counter value of 250 is not clearly older than message B2's counter value of 7 even though A2 was in fact sent as message with natural sequence number 1907450 before the natural sequence number of 1907463 of message B2.

Restricting the producer to a maximum number LO of messages that are in transit at any given time can be satisfied by a number of different known techniques, but in particular any technique that ensures the average message generation rate for producer nodes is less that the message clearance rate of the network (or the rate at which messages are deemed to have fully propagated though their respective network paths). The clearance rate may be defined as the time interval during which any given message frame can remain in transit within the network. Practical examples of ensuring this condition is satisfied include (i) network throttling and (ii) assigning time to live (TTL) values to messages. In the latter case, the network defines its own clearance rate based on the TTL value which may be statically or dynamically determined and locally or globally dictated as part of, and in response to, network operations. A TTL value may also be used to discriminate message longevity priorities for different network nodes to allow for varying network conditions or volume priorities among network nodes.

For purposes of a small sensing or control node in IoT applications, it is reasonable to assume that the clearance rate for any network is very much greater than the message generation rate from any given IoT node such that the inherent time differences ensure the condition is satisfied. When applying process 900 to sequence numbers generated using this technique, the newest message can be identified by comparing any message pair generated by the producer node and seen by a consumer node. This applies to any arbitrary number of defined sequence number bits.

In one embodiment, the techniques described in this disclosure may further include statically or dynamically scaling the LO counter value to throttle one or more of the nodes on the network. As indicated above, the counter value LO may be set to any value in the set comprising $\{0, 1, 2 \ldots 2^{b-1}-1\}$. This begs the question, why use any value other than the maximum permissible, as this dictates the maximum number of messages in flight. The answer is that by defining different values of the LO counter value for different nodes, each node can maintain its own varying numbers of message frames that are circulating in the network (i.e., 'in process'). This can provide the capability to throttle different network nodes in relation to one another based on the number of nodes in the network or the available network bandwidth. One node may be throttled in relation to other nodes to prioritize or de-prioritize that node's generated traffic. Any given network may therefore dictate the value of LO, either statically or dynamically, as well as globally or locally, to realize message volume flow targets against various network or business constraints.

Thus, in one embodiment the value LO may be used for constraining the spread of sequence count values currently in process in the network at any given moment. The number of bits required to accommodate this spread may be determined by the maximum number of messages that may be in process at any given instant and not the total messages that may be sent. In a small IoT sensor network, the number of messages generated by a node may be generally small in relation to the network clearance (processing) time available.

The novel embodiments of the counting mechanism described in this disclosure provide the ability to tradeoff a much shorter counter against the time span over which the counter value is unique. As long as the message generation rate from any source node is less than the time it takes for all messages to propagate through the network, the counter value will always appear unique to the network nodes. For larger or fast networks, the same technique can be performed using more bits and using field divisions that are tuned to the network characteristics to allow more frames to be in process at any given time. The techniques described herein provide for a fixed, integer domain sequence number with limited range to be simply scaled according to the number of messages in circulation in the network using a digital counter representation. Whereas it is possible for hash values to collide, hash collisions are statistically rare and are therefore well suited for a probabilistic delivery mechanism.

Although illustrative embodiments have been described herein with reference to the accompanying drawings, it is to be understood that the present invention is not limited to those precise embodiments, and that various other changes and modifications may be affected therein by one skilled in the art without departing from the scope or spirit of the invention.

What is claimed is:

1. A method for disambiguating message frames based on message age in a mesh network, the method comprising:
   at a network node comprising a mobile device that includes a processor, a memory, an internal clock, a digital counter comprising a number of bits, and a radio device for communicating with a plurality of network nodes over a wireless radio network, wherein network nodes only communicate with correspondent network nodes using broadcast network messages, wherein network nodes are configured for rebroadcasting received network messages to correspondent network nodes on the wireless radio network, and wherein the network nodes are configured for synchronized communications over the wireless radio network based on broadcasting synchronization frames in accordance with a synchronization interval, the network node adapted to perform operations comprising:

associating counter values provided by the digital counter with message frames broadcast from the network node, wherein the digital counter generates a sequence of numbers using the counter values, and wherein numbers in the sequence of numbers provided by the digital counter are incremented for each message frame broadcast by the network node onto the wireless radio network and wrap back to zero after a highest number in the sequence given by the counter values has been reached;

dividing a number domain of the sequence of numbers generated by the digital counter into (i) a low sub-domain delineated from zero up to a low counter value and (ii) a high sub-domain delineated from a high counter value greater than the low counter value up to the highest number in the sequence of numbers given by the counter values;

constraining a maximum number of message frames broadcast from the network node that can be circulating in the wireless radio network to the low counter value; and determining whether a newly received message frame is older or newer than a copy of the message frame that was previously received by the network node by comparing the counter value of the newly received message frame with the counter value of the previously received copy of the message frame.

2. The method of claim 1 wherein determining whether the newly received message frame is older or newer than the previously received copy of the message frame comprises:

determining the newly received message frame is newer than the previously received copy of the message frame when the newly received message frame has a counter value that is less than the low counter value and the previously received copy of the message frame has a counter value that is greater than the high counter value;

(ii) determining the previously received copy of the message frame is newer than the newly received message frame when the previously received copy of the message frame has a counter value that is less than the low counter value and the newly received message frame has a counter value that is greater than the high counter value; and (iii) else, determining the digital counter has not wrapped, and the message frame of the newly received message frame and the previously received copy of the message frame that has the greater counter value is determined to be newer.

3. The method of claim 1 wherein the low sub-domain is defined within a number range of $\{0, \ldots 2^{b-1}-1\}$ and the high sub-domain is defined within a number range of $2^b$ minus the low sub-domain.

4. The method of claim 1 wherein the digital counter is configured to be of a first size and message frame generation rate of the network node is configured to be of a first rate so that no two message frames broadcast from the network node remain in circulation in the wireless radio network for a time period longer than that required for the digital counter to wrap back to zero.

5. The method of claim 4 wherein the message frame generation rate of the network node is less than a rate at which message frames broadcast from the network node are deemed to have propagated through the wireless radio network.

6. The method of claim 1 further comprising generating a unique identifier for each message frame broadcast onto the wireless radio network by the network node, the unique identifier comprising the network node's address, the counter value for each message frame, and a hash value of the contents of the message frame and its counter value.

7. The method of claim 1 wherein a clearance rate for the wireless radio network is defined based on one or more time to live (TTL) values associated with message frames broadcast by one or more of the network nodes in the wireless radio network, wherein the clearance rate is indicative of a time interval during which any message frame of the message frames remains in transit within the wireless radio network.

8. The method of claim 7 wherein the clearance rate for the wireless radio network is statically or dynamically determined in response to network operations.

9. The method of claim 1 further comprising statically or dynamically scaling the low counter value to throttle one or more network nodes.

10. The method of claim 1 further comprising indicating additional system state information based upon an in-band use of the value zero in the sequence counter.

11. A mobile communications device configured as a network node for broadcasting message frames in a mesh network, the mobile communications device comprising:

a processor;

a memory;

an internal clock;

a digital counter comprising a number of bits, and a radio device for communicating with a plurality of network nodes over a wireless radio network, wherein the network nodes only communicate with correspondent network nodes using broadcast network messages, wherein network nodes are configured for rebroadcasting received network messages to correspondent network nodes on the wireless radio network, and wherein the network nodes are configured for synchronized communications over the wireless radio network based on broadcasting synchronization frames in accordance with a synchronization interval, the mobile communications device adapted for performing operations comprising:

associating counter values provided by the digital counter with message frames broadcast from the network node, wherein the digital counter generates a sequence of numbers using the counter values, and wherein numbers in the sequence of numbers provided by the digital counter are incremented for each message frame broadcast by the network node onto the wireless radio network and wrap back to zero after a highest number in the sequence given by the counter values has been reached;

dividing a number domain of the sequence of numbers generated by the digital counter into (i) a low sub-domain delineated from zero up to a low counter value and (ii) a high sub-domain delineated from a high counter value greater than the low counter value up to the highest number in the sequence of numbers given by the counter values;

constraining a maximum number of message frames broadcast from the network node that can be circulating in the wireless radio network to the low counter value; and determining whether a newly received message frame is older or newer than a copy of the message frame that was previously received by the network node by comparing the counter value of the newly received message frame with the counter value of the previously received copy of the message frame.

12. The mobile communications device of claim 11 wherein the operation of determining whether the newly received message frame is older or newer than the previously received copy of the message frame comprises:

(i) determining the newly received message frame is newer than the previously received copy of the message frame when the newly received message frame has a counter value that is less than the low counter value and the previously received copy of the message frame has a counter value that is greater than the high counter value;

(ii) determining the previously received copy of the message frame is newer than the newly received message frame when the previously received copy of the message frame has a counter value that is less than the low counter value and the newly received message frame has a counter value that is greater than the high counter value; and (iii) else, determining the digital counter has not wrapped, and the message frame of the newly received message frame and the previously received copy of the message frame that has the greater counter value is determined to be newer.

13. The mobile communications device of claim 11 wherein the low sub-domain is defined within a number range of $\{0, \ldots 2^{b-1}-1\}$ and the high sub-domain is defined within a number range of $2^b$ minus the low sub-domain.

14. The mobile communications device of claim 11 wherein the digital counter is configured to be of a first size and message frame generation rate of the network node is configured to be of a first rate so that no two message frames broadcast from the network node remain in circulation in the wireless radio network for a time period longer than that required for the digital counter to wrap back to zero.

15. The mobile communications device of claim 14 wherein the message frame generation rate of the network node is less than a rate at which message frames broadcast from the network node are deemed to have propagated through the wireless radio network.

16. The mobile communications device of claim 11 wherein the operations further comprise generating a unique identifier for each message frame broadcast onto the wireless radio network by the network node, the unique identifier comprising the network node's address, the counter value for each message frame, and a hash value of the contents of the message frame and its counter value.

17. The mobile communications device of claim 11 wherein a clearance rate for the wireless radio network is defined based on one or more time to live (TTL) values associated with message frames broadcast by one or more of the network nodes in the wireless radio network, wherein the clearance rate is indicative of a time interval during which any message frame of the message frames remains in transit within the wireless radio network.

18. The mobile communications device of claim 17 wherein the clearance rate for the wireless radio network is statically or dynamically determined in response to network operations.

19. The mobile communications device of claim 11 further comprising statically or dynamically scaling the low counter value to throttle one or more network nodes.

20. The mobile communications device of claim 11 wherein the operations further comprise indicating additional system state information based upon an in-band use of the value zero in the sequence counter.

21. A non-transitory computer readable medium configured for storing programmed computer code executable by a processor for performing operations implementing a network node in a mesh network, the network node comprising a mobile communications device that includes a processor, a memory, an internal clock, a digital counter, and a radio device for communicating with a plurality of network nodes over a wireless radio network, wherein network nodes only communicate with correspondent network nodes via broadcast network messages, wherein network nodes are configured for rebroadcasting received network messages to correspondent network nodes on the wireless radio network, and wherein the network nodes are configured for synchronized communications over the wireless radio network based on broadcasting synchronization frames in accordance with a synchronization interval, the operations comprising:

associating counter values provided by the digital counter with message frames broadcast from the network node, wherein the digital counter generates a sequence of numbers using the counter values, and wherein numbers in the sequence of numbers provided by the digital counter are incremented for each message frame broadcast by the network node onto the wireless radio network and wrap back to zero after a highest number in the sequence given by the counter values has been reached;

dividing a number domain of the sequence of numbers generated by the digital counter into (i) a low sub-domain delineated from zero up to a low counter value and (ii) a high sub-domain delineated from a high counter value greater than the low counter value up to the highest number in the sequence of numbers given by the counter values;

constraining a maximum number of message frames broadcast from the network node that can be circulating in the wireless radio network to the low counter value; and determining whether a newly received message frame is older or newer than a copy of the message frame that was previously received by the network node by comparing the counter value of the newly received message frame with the counter value of the previously received copy of the message frame.

22. The non-transitory computer readable medium of claim 21 wherein the operation of determining whether the newly received message frame is older or newer than the previously received copy of the message frame comprises:

(i) determining the newly received message frame is newer than the previously received copy of the message frame when the newly received message frame has a counter value that is less than the low counter value and the previously received copy of the message frame has a counter value that is greater than the high counter value;

(ii) determining the previously received copy of the message frame is newer than the newly received message frame when the previously received copy of the message frame has a counter value that is less than the low counter value and the newly received message frame has a counter value that is greater than the high counter value; and (iii) else, determining the digital counter has not wrapped, and the message frame of the newly received message frame and the previously received copy of the message frame that has the greater counter value is determined to be newer.

23. The non-transitory computer readable medium of claim 21 wherein the digital counter is configured to be of a first size and message frame generation rate of the network node is configured to be of a first rate so that no two message frames broadcast from the network node remain in circulation in the wireless radio network for a time period longer than that required for the digital counter to wrap back to zero.

24. The non-transitory computer readable medium of claim 23 wherein the message frame generation rate of the network node is less than a rate at which message frames broadcast from the network node are deemed to have propagated through the wireless radio network.

* * * * *